(12) United States Patent
Kashioka

(10) Patent No.: US 8,055,998 B2
(45) Date of Patent: Nov. 8, 2011

(54) PROCESSING INSTRUCTIONS IN A CHANGED DOCUMENT OBJECT

(75) Inventor: Atsushi Kashioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 12/467,296

(22) Filed: May 17, 2009

(65) Prior Publication Data

US 2009/0287993 A1 Nov. 19, 2009

(30) Foreign Application Priority Data

May 19, 2008 (JP) ................................ 2008-130649

(51) Int. Cl.
*G06F 17/00* (2006.01)
(52) U.S. Cl. ........................ 715/229; 715/204; 358/3.28
(58) Field of Classification Search .................. 715/229, 715/204; 707/638; 358/3.28
See application file for complete search history.

(56) References Cited

U.S. PATENT DOCUMENTS

| | | | |
|---|---|---|---|
| 5,220,657 A | 6/1993 | Bly et al. | |
| 7,007,231 B2* | 2/2006 | Dang | 715/213 |
| 7,035,910 B1 | 4/2006 | Dutta et al. | |
| 2005/0120061 A1* | 6/2005 | Kraft | 707/203 |
| 2010/0011441 A1* | 1/2010 | Christodorescu et al. | 726/24 |

FOREIGN PATENT DOCUMENTS

| | | |
|---|---|---|
| EP | 371603 A2 | 6/1990 |
| JP | 2002-215856 A | 8/2002 |
| JP | 2007-200136 A | 8/2007 |

OTHER PUBLICATIONS

Picard, Willy, XP010558790, "Collaborative Document Edition in a Highly Concurrent Environment", Sep. 2001, IEEE, pp. 514-518.

* cited by examiner

*Primary Examiner* — Adam M Queler
(74) *Attorney, Agent, or Firm* — Canon U.S.A., Inc., IP Division

(57) ABSTRACT

A main control unit determines whether or not a previous version with which comparison is to be made exists regarding a document stored in a session storage unit. Next, confirmation is made regarding whether or not there is difference between both compared objects, and the control unit determines whether or not there is difference. The main control unit then executes an action embedded in the attributes of the object data. The object data with difference that has been saved in the session information storage unit is saved in a document information storage unit.

11 Claims, 20 Drawing Sheets

FIG. 6

| NAME | DEPARTMENT AFFILIATION | POST | DEPARTMENT SUPERIOR | PROJECT | BUSINESS OPERATION | PROJECT SUPERIOR | ... |
|------|------------------------|------|---------------------|---------|--------------------|-----------------:|-----|
| USER A | DESIGN ROOM 1 | REGULAR EMPLOYEE | USER B | DOCUMENT MANAGEMENT a | INSTALLER | USER C | ... |
| USER B | DESIGN ROOM 1 | SECTION MANAGER | USER X | DOCUMENT MANAGEMENT a | PROGRAM MANAGER | USER X | ... |
| USER C | DESIGN ROOM 2 | CHIEF | USER Y | DOCUMENT MANAGEMENT a | INSTALLER | USER B | ... |
| USER D | DESIGN ROOM 2 | REGULAR EMPLOYEE | USER Y | DOCUMENT MANAGEMENT a | WEB | USER B | ... |
| ... | ... | ... | ... | ... | ... | ... | ... |
| USER X | DESIGN DIVISION | DIVISION MANAGER | USER Z | DOCUMENT MANAGEMENT a | PROGRAM MANAGER | USER Z | ... |

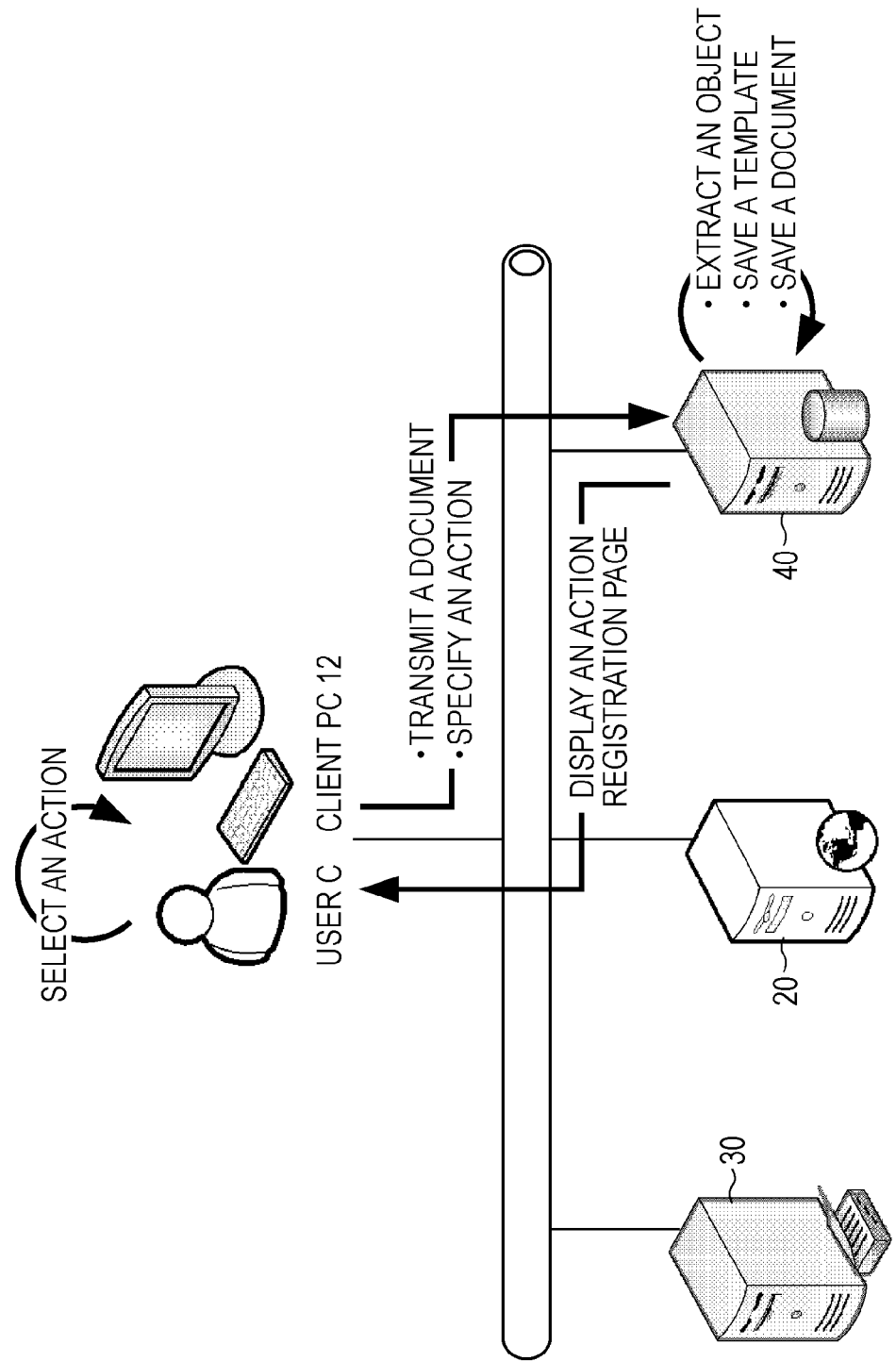

RECORDING MEDIUM SUCH AS A FD, CD-ROM, OR THE LIKE

| DIRECTORY INFORMATION |
|---|
| THE FIRST DATA PROCESSING PROGRAM<br>THE PROGRAM CODE GROUP CORRESPONDING TO THE STEPS OF THE FLOWCHART SHOWN IN FIG. 5 |
| THE SECOND DATA PROCESSING PROGRAM<br>THE PROGRAM CODE GROUP CORRESPONDING TO THE STEPS OF THE FLOWCHART SHOWN IN FIG. 8 |
| THE THIRD DATA PROCESSING PROGRAM<br>THE PROGRAM CODE GROUP CORRESPONDING TO THE STEPS OF THE FLOWCHART SHOWN IN FIG. 11 |
| THE FOURTH DATA PROCESSING PROGRAM<br>THE PROGRAM CODE GROUP CORRESPONDING TO THE STEPS OF THE FLOWCHART SHOWN IN FIG. 12 |
| THE FIFTH DATA PROCESSING PROGRAM<br>THE PROGRAM CODE GROUP CORRESPONDING TO THE STEPS OF THE FLOWCHART SHOWN IN FIG. 13 |
| THE SIXTH DATA PROCESSING PROGRAM<br>THE PROGRAM CODE GROUP CORRESPONDING TO THE STEPS OF THE FLOWCHART SHOWN IN FIG. 17 |
| THE SEVENTH DATA PROCESSING PROGRAM<br>THE PROGRAM CODE GROUP CORRESPONDING TO THE STEPS OF THE FLOWCHART SHOWN IN FIG. 19 |

MEMORY MAP OF RECORDING MEDIUM

PROCESSING INSTRUCTIONS IN A CHANGED DOCUMENT OBJECT

BACKGROUND OF THE INVENTION

1. Field of the Invention

The present invention relates to a management system for performing document management at the time of executing a workflow, or the like.

2. Description of the Related Art

Nowadays, there is great interest in activities and laws for proving that a company/organization is managed properly with regard to internal control and so forth. Information technology for business operations processes is being developed to handle such activities and laws, wherein a procedure for achieving document creation and a business operation is determined beforehand, and whether work is carried out in accordance with the procedure is monitored, which can be proved in the case of audit. With a system provided here, not only various types of document products obtained according to the progress of business operations, but also the management of progress status, become important.

Therefore, a workflow system which can be customized according to the business operations of each company has been provided, wherein each of all the business operation processes starts work by employing a user interface provided by the workflow system, and is completed on the workflow system.

On the other hand, there is a need to manage a document created during business operations, and a document generated at each process to achieve business operations, so a great number of document management systems for providing a workflow function have been proposed.

However, in reality, there are cases where work cannot be realized at all of the processes with a customized workflow system or on document management system application for providing a workflow function. An example of such a case is where with one process of all the processes, creation of a document itself is performed by employing a document creation application such as Office (registered trademark) manufactured by Microsoft Corporation, or a case where paper media is a product.

As a conventional example for solving such a case, there has been proposed a business operation support system for providing a workflow function of which the object is to execute a business operation flow smoothly by correlating electronic data obtained by scanning paper documents existing at each business operations flow with the corresponding business operations flow (see Japanese Patent Laid-Open No. 2007-200136).

With such a business operation support system, IDs for determining business operations and documents are embedded as control information at the time of printing on paper at each process, and at the time of scanning printed paper, the processing proceeds to the next action stipulated by the control information beforehand, thereby realizing a business operation flow employing paper documents.

A document created as a product at each process of a business operation flow is commonly approved through a great number of persons until a process wherein the document is issued as an official document.

With Japanese Patent Laid-Open No. 2007-200136, a different document creation phase is provided at each process of a business operation flow, and accordingly, consideration regarding a flexible process management at the time of one document becoming an official version is not sufficient. Further, with regard to the operation content of a document at each process, this system is not a system which can be provided to a user readily.

Also, with the control information of Japanese Patent Laid-Open No. 2007-200136, and a stipulated business operation flow, only an arrangement for proceeding to the next process has been disclosed, an in a case where there is sending back due to a defect given in information or the like at each process, there is no function wherein the process returns to the previous process, and after a correction, the business operation flow can be resumed. Accordingly, the business operation flow is discarded once regardless of the progress status, and consequently, a document is created based on a new business operation flow.

SUMMARY OF THE INVENTION

The present invention provides an arrangement which can be employed for, for example, the process management of a workflow or the like, thereby executing and managing fixed form operation of particular document information effectively.

A management device according to an embodiment of the present invention has the following configuration. A management device for managing document information includes: an extracting unit configured to extract an object from the document information; a comparison unit configured to compare first and second objects extracted from the document information, a first object having been extracted by the extracting unit from document information of a current version of a document, and a second object corresponding to the first object having been extracted from document information of a previous version of the document, and to determine whether there is a change between the first and second objects; and a processing unit configured to perform a process, based on instructions included in the changed object determined by the comparison unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram illustrating an example of a user characteristic table stored in a user information storage unit shown in FIG. 3.

FIG. 7 is a diagram illustrating an example of template registration processing with the document management system according to the present embodiment.

FIG. 15 is a diagram illustrating an example of a user interface with the document management system according to the present embodiment.

FIG. 21 is a diagram describing the memory map of a storage medium which stores various types of data processing program which can be read out with the document management system according to the present embodiment.

DESCRIPTION OF THE EMBODIMENTS

Next, description will be made regarding preferred embodiments for carrying out the present invention, with reference to the drawings.

Description of System Configuration

System Configuration

Figure 1:
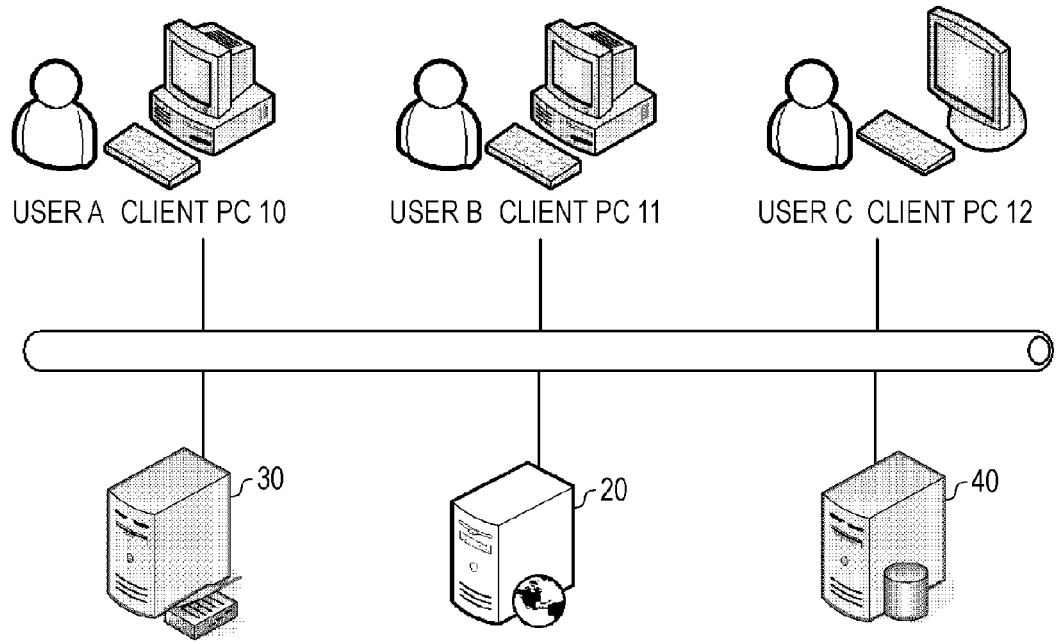
FIG. 1 is a diagram describing the configuration of a document management system according to the present embodiment.

FIG. 1 is a diagram describing the configuration of a document management system according to a first embodiment. In FIG. 1, reference numeral 10 denotes a client PC, where a user A accesses the document management system through a browser. Reference numeral 11 denotes a client PC, where a user B accesses the document management system through a browser. Reference numeral 12 denotes a client PC, where a user C accesses the document management system through a browser.

Reference numeral 20 denotes a web application server PC, which provides a web application. Reference numeral 30 denotes a user management server PC, which manages the information of users who access the present system. Reference numeral 40 denotes a document management server, which includes a function for saving/managing a document. Note that the above-mentioned client PCs 10 through 12, web application server PC 20, user management server PC 30, and document management server PC 40 are connected through a network so as to be mutually communicable. Note that the PCs and servers making up the above-mentioned system include a hardware resource and software resource, execute various types of program under the control of the OS, thereby performing various types of data processing, communication processing, and management processing.

Here, the web application server PC 20, user management server PC 30, and document management server PC 40 are disposed separately, but may be configured of one PC. Also, an arrangement is made wherein the users A, B, and C operate the client PCs 10, 11, and 12, respectively. However, an arrangement may be made wherein one of the web application server PC 20, user management server PC 30, and document management server PC 40, or all of the PCs are operated by the same client PC.

Further, an arrangement is made wherein, with the document management system according to the present embodiment, the users A, B, and C access the network through a browser installed in the client PC. However, an arrangement may be made wherein a shown dedicated client application is installed in the client PCs 10, 11, and 12, and is operated. In this case, an arrangement may be made wherein the document management server PC 40 and the dedicated client application communicate without employing the web application server PC 20.

Hardware Configuration

Figure 2:
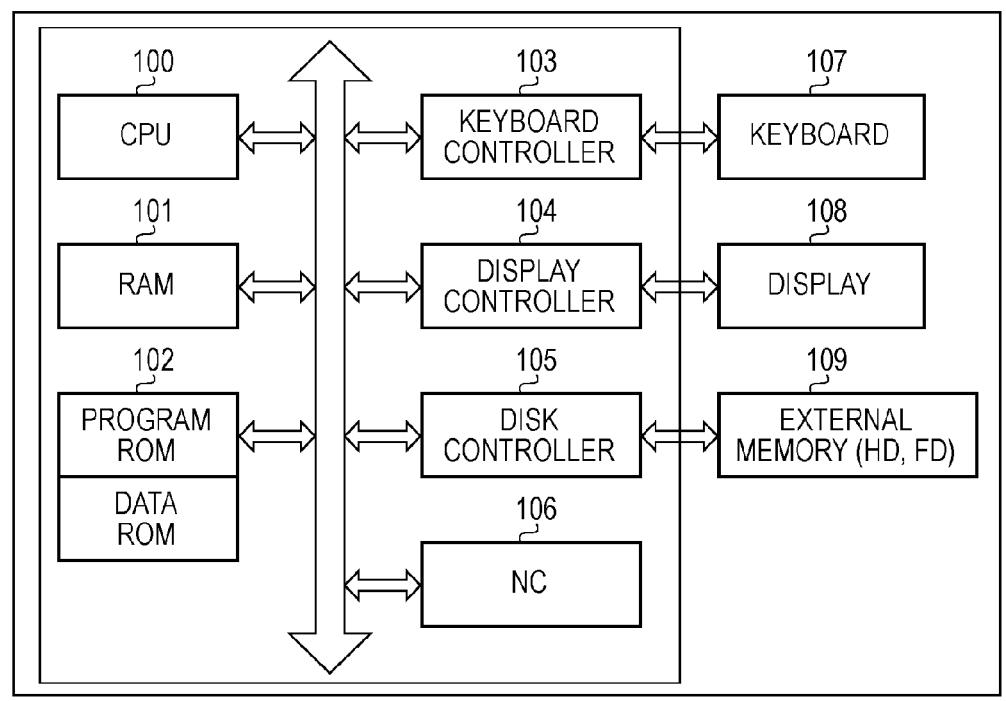
FIG. 2 is a block diagram describing the hardware configuration of each PC making up the document management system according to the present embodiment.

FIG. 2 is a block diagram describing the hardware configuration of each PC making up the document management system according to the present embodiment. Note that the present example is equivalent to the hardware configuration diagram of a common information processing device, and the hardware configuration of a common information processing device may be applied to each PC according to the present embodiment.

In FIG. 2, a CPU 100 executes a program such as the OS or application or the like stored in the program ROM of ROM 102, or loaded in RAM 101 from external memory 109 such as a hard disk or the like. Here, "OS" is an abbreviation of an operating system which runs on a computer, and hereafter, the operating system will be referred to as "OS". The processing of each of later-described flowcharts can be realized by execution of this program.

The RAM 101 severs as the main memory, work area, or the like of the CPU 100. A keyboard controller 103 controls key input from a keyboard 107 or unshown pointing device. A display controller 104 controls display of various types of display 108. A disk controller 105 controls data access with external memory 109 such as a hard disk (HD), flexible disk (FD), or the like. An NC 106 is connected to the network, and executes communication control processing as to other devices connected to the network.

Software Configuration

Figure 3:
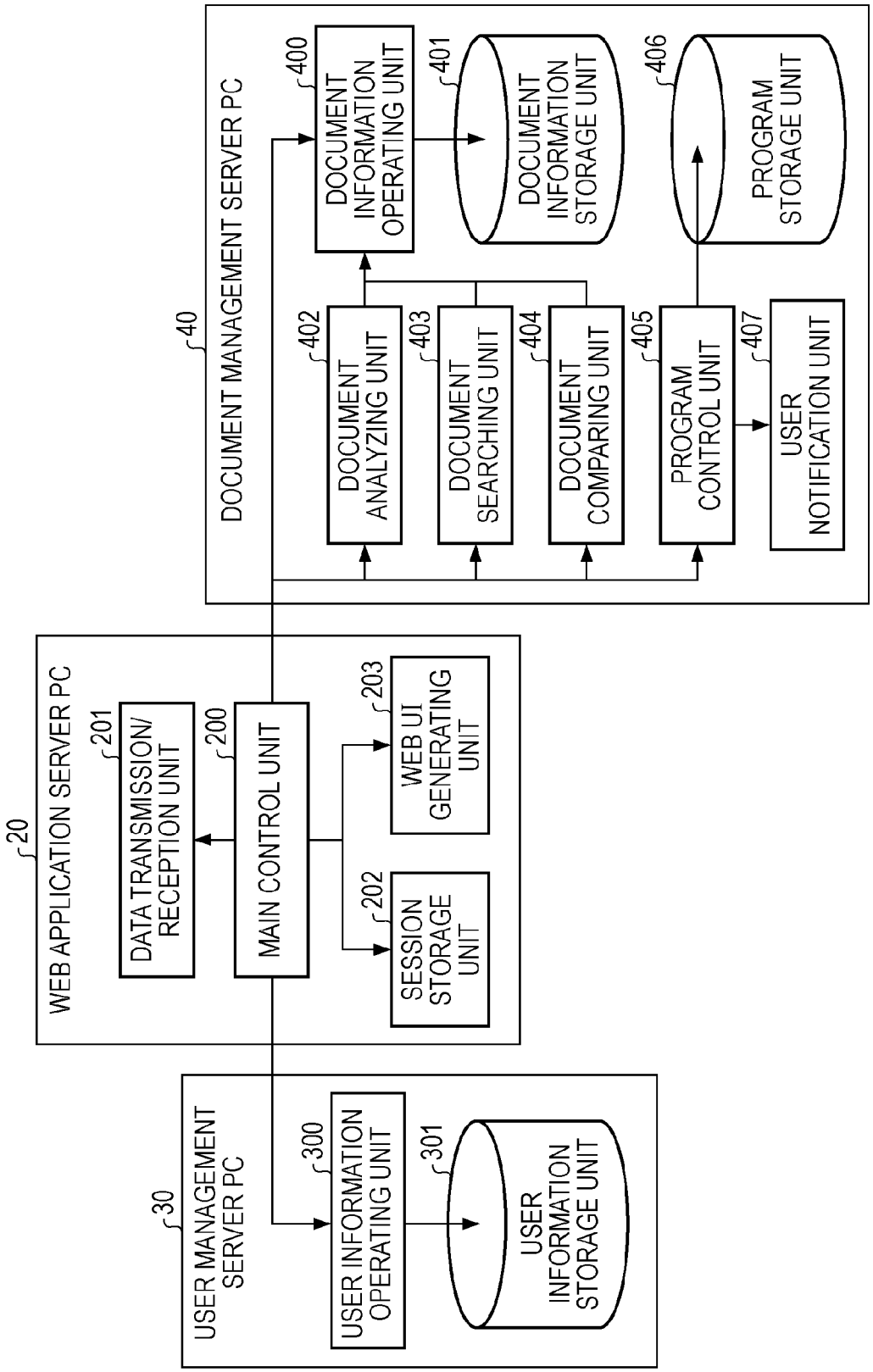
FIG. 3 is a diagram describing a software configuration illustrating an example of a document management system according to an embodiment of the present invention.

FIG. 3 is a diagram describing a software configuration illustrating an example of the document management system according to an embodiment of the present invention. The present example illustrates software configurations within the web application server PC 20, user management server PC 30, and document management server PC 40 shown in FIG. 1.

In FIG. 3, a main control unit 200 controls the entirety of the document management system, and performs instructions and management as to each of later-described units. A data transmission/reception unit 201 receives a command which the user outputs through a browser at the client PC 10, and responds results of the instruction being received from the main control unit 200, to the client PC 10.

After the user accesses the present document management system through a browser at the client PC 10, a session storage unit 202 generates session information indicating the access from the same user.

Further, the session storage unit 202 holds various types of information to be employed repeatedly in correlation with the session information until the user stops access to the present document management system (logout), or the session is expired by automatic timeout or the like.

A web UI generating unit 203 receives an instruction from the main control unit 200, and generates a web UI (HTML) corresponding to a situation. The web UI generated by the web UI generating unit 203 is not restricted to HTML, and a script language such as Java (registered trademark) script or the like may be embedded therein.

Next, a user information operating unit 300 performs an operation such as extraction, editing, or the like of a user who can access the present document management system, and user characteristics stored in a user information storage unit 301 in accordance with an instruction from the main control unit 200. Here, with regard to user management, user characteristics alone may be stored in the user information storage unit 301 by the user information operating unit 300 collaborating with Active Directory, LDAP, or the like which is a known technique instead of the management unique to the present document management system.

Next, a document information operating unit 400 registers and stores the entity of a document, the template of the document, objects wherein the region within a document page is divided, the difference of objects, and various types of history in accordance with an instruction from the main control unit 200.

Further, the document information operating unit 400 performs an operation such as extraction, editing, or the like of the entity of a document stored in the document information storage unit 401, the template of the document, objects wherein the region within a document page is divided, the difference of objects, and various types of history.

In accordance with an instruction from the main control unit 200, a document analyzing unit 402 analyzes within a document page, performs division of a region, adds attribute information to objects obtained by division of a region, and registers and stores this in the document information storage unit 401 through the document information operating unit 400.

In accordance with an instruction from the main control unit 200, a document searching unit 403 searches and obtains a document, the template of the document, and objects from the document information storage unit 401 through the document information operating unit 400.

In accordance with an instruction from the main control unit 200, a document comparing unit 404 performs comparison between objects. In accordance with an instruction from the main control unit 200, a program control unit 405 reads out a program stored in a program storage unit 406, and embeds the program in the attribute information of an object. Further, the program control unit 405 executes an action in accordance with the program stored in the object. When executing an action in accordance with the program stored in an object, a user notification unit 407 employs an e-mail notification or unshown user interface to be displayed on the client PCs 10, 11, and 12 to inform the users of this situation.

Description will be made specifically below regarding processing with the document management system according to the first embodiment of the present invention, with reference to FIGS. 1 through 15.

Login and User Characteristics Registration Processing

Figure 4:
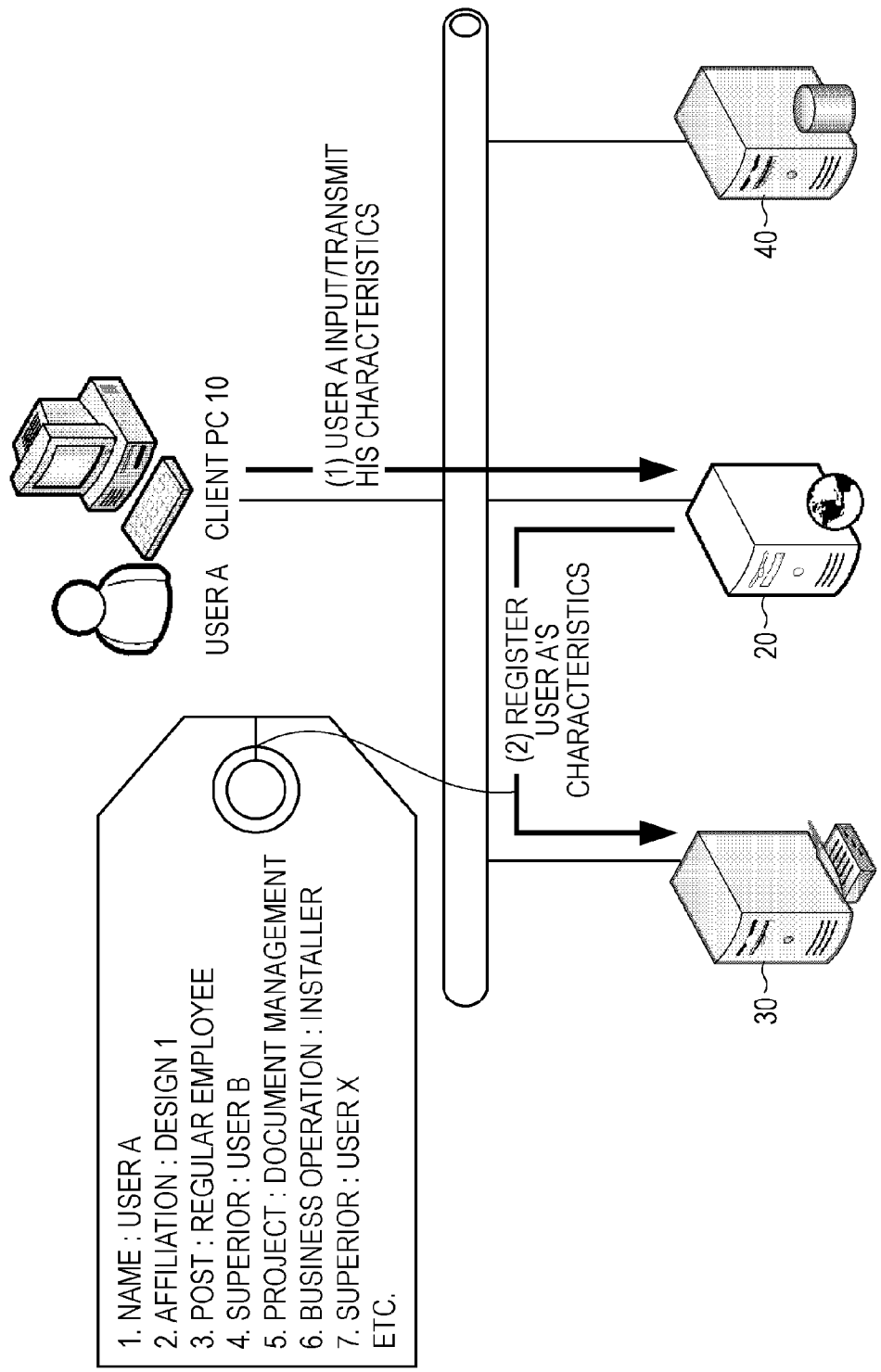
FIG. 4 is a diagram illustrating an example of login in the document management system according to the present embodiment, and user characteristics registration processing.

FIG. 4 is a diagram illustrating an example of login and user characteristics registration processing with the document management system according to the present embodiment. The present example is a processing example wherein the user A accesses (logs in to) the present document management system through the browser of the client PC 10. Note that the user has to input user characteristics at the time of first login.

Figure 5:
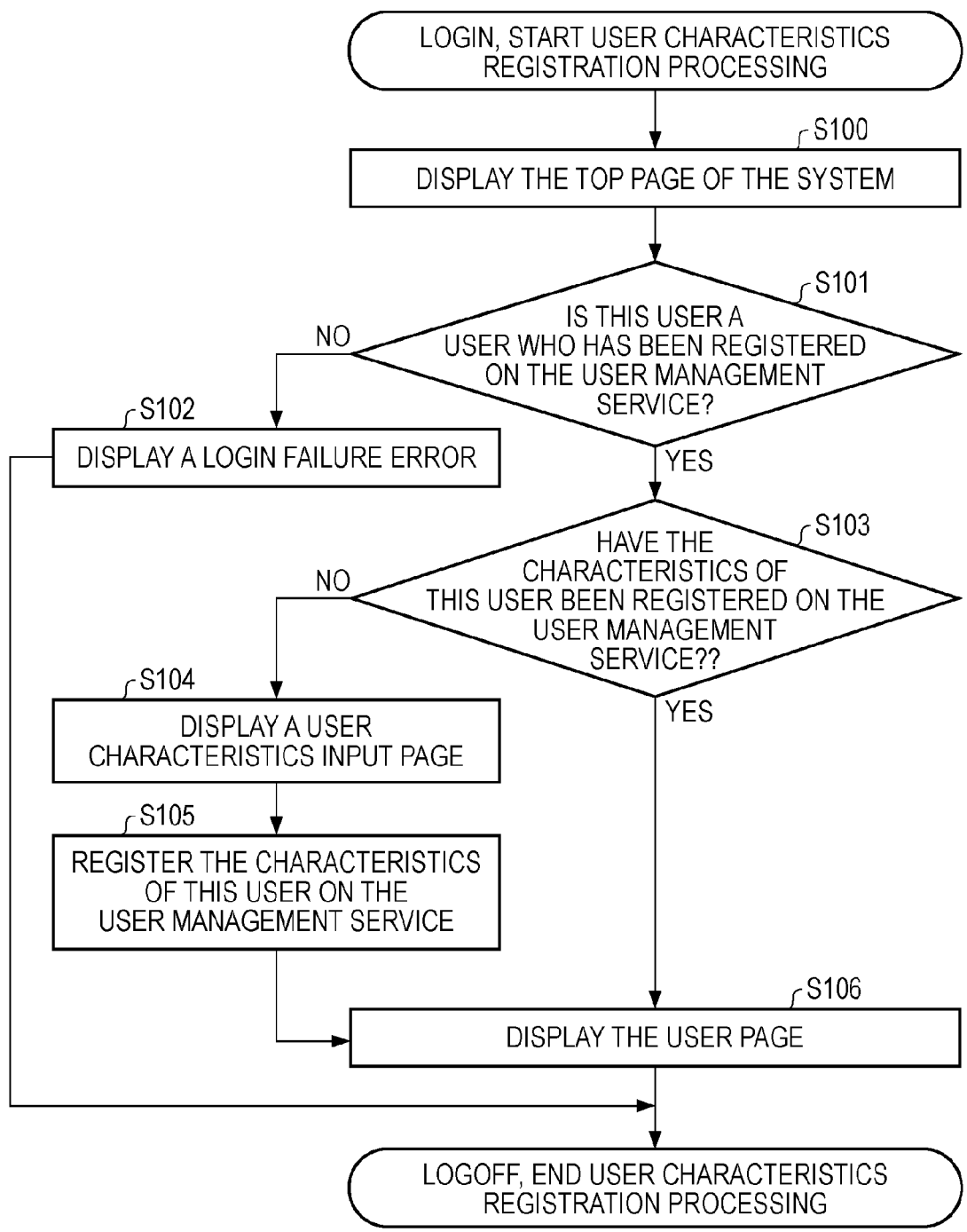
FIG. 5 is a flowchart illustrating an example of a first data processing procedure with the document management system according to the present embodiment.

FIG. 5 is a flowchart illustrating an example of a first data processing procedure with the document management system according to the present embodiment. The present example is a processing example wherein a user logs in the present system to register user characteristics. Note that reference symbols S100 through S106 denote the respective steps. Also, each step is realized by the main control unit 200 of the web application server PC 20 executing the control program of the CPU 100 of the user management server PC 30. Here, the control program includes software shown in FIG. 3.

Upon the user A accessing the top page of the present document management system through the browser of the client PC 10 in step S100, the main control unit 200 of the web application server PC 20 receives a request through the data transmission/reception unit 201. Subsequently, the main control unit 200 of the web application server PC 20 requests the web UI generating unit 203 to generate a top page, returns the top page to the client PC 10 as a response, and causes the browser of the client PC 10 to display the top page.

Next, upon the user A operating the pointing device to input login information at the top page displayed in step S100, the main control unit 200 receives the login information of the user A through the data transmission/reception unit 201. For example, the login information includes a user name, password, and so forth.

Subsequently, the main control unit 200 inquires of the user information operating unit 300 of the user management server PC 30 whether or not the user A is a user registered in the user information storage unit 301. As a result thereof, in a case where the main control unit 200 determines that the user A does not exit in the user information storage unit 301, or that the password is wrong, the main control unit 200 proceeds to step S102. Subsequently, in step S102, the main control unit 200 requests the web UI generating unit 203 to generate a login failure error page. Subsequently, the main control unit 200 returns the login failure error page to the client PC 10 through the data transmission/reception unit 201 as a response, and causes the browser of the client PC 10 to display the login failure error page, and ends the present processing.

On the other hand, in a case where the main control unit 200 determines in step S101 that the user A exist in the user information storage unit 301, and also the password is right, the main control unit 200 proceeds to step S103.

Subsequently, in step S103, the main control unit 200 causes the session storage unit 202 to generate session information. Subsequently, the main control unit 200 inquires the user information operating unit 300 whether or not the user characteristics of the user A is registered in the user information storage unit 301. Note that the timing for generating session information is not restricted to this. In a case where the main control unit 200 determines that the user characteristics of the user A is not registered, the main control 200 proceeds to step S104, where the main control unit 200 requests the web UI generating unit 203 to generate a user characteristics input page. Subsequently, the control main unit 200 returns the user characteristics input page to the client PC 10 through the data transmission/reception unit 201 as a response, and causes the browser of the client PC 10 to display the user characteristics input page.

Next, upon the user A inputting user characteristics to the user characteristics input page displayed in step S104, the main control unit 200 receives the user characteristics of the user A through the data transmission/reception unit 201.

Subsequently, in step S105, the main control unit 200 instructs the user information operating unit 300 to register the received user characteristics of the user A on the user information storage unit 301. At this time, the main control unit 200 also instructs the session storage unit 202 to hold the user characteristics along with the generated session information. Thus, there is no need to obtain the user characteristics information of the user A from the user information storage unit 301 each time, whereby the processing speed can be improved.

FIG. 6 is a diagram illustrating an example of a user characteristics table held at the user information storage unit 301 shown in FIG. 3. With the present example, as user characteristics, there are a department affiliation, post, department superior (acknowledger), project, business operations within the project, project superior, and so forth, which are employed for later-described action execution processing. Note that information other than these may be included as user characteristics. Further, multiple values may be included as user characteristics items. For example, in the case of a user to multiple projects, the user had better select multiple values.

Also, with regard to the form of the user characteristics input page, it is desirable for a user not to input a user characteristics item freely but to select a user characteristics item. Therefore, it is desirable for an administrator of an installation destination to set suitable selection items beforehand according to a user environment in which the present document management system is introduced.

Next, in step S106, the main control unit 200 controls the web UI generating unit 203 to generate a page of the user A. Subsequently, the main control unit 200 returns the page of the user A to the client PC 10 through the data transmission/reception unit 201 as a response, and controls the browser of the client PC 10 to display the page of the user A, and ends the present processing.

Template Registration Processing

With the present embodiment, in order to realize a workflow, a document template for providing a workflow is created beforehand, and is stored in the document information storage unit 401 of the document management server PC 40. Specifically, the user C accesses (logs in to) the present document management system through the browser of the client PC 12, registers a document to be registered as a template, and specifies an action for realizing a workflow, and stores this in the present system.

FIG. 7 is a diagram illustrating an example of template registration processing with the document management system according to the present embodiment. The present example is an example wherein the user C access (logs in to) the present document management system through the browser of the client PC 12, and registers the template of a document.

Figure 8:
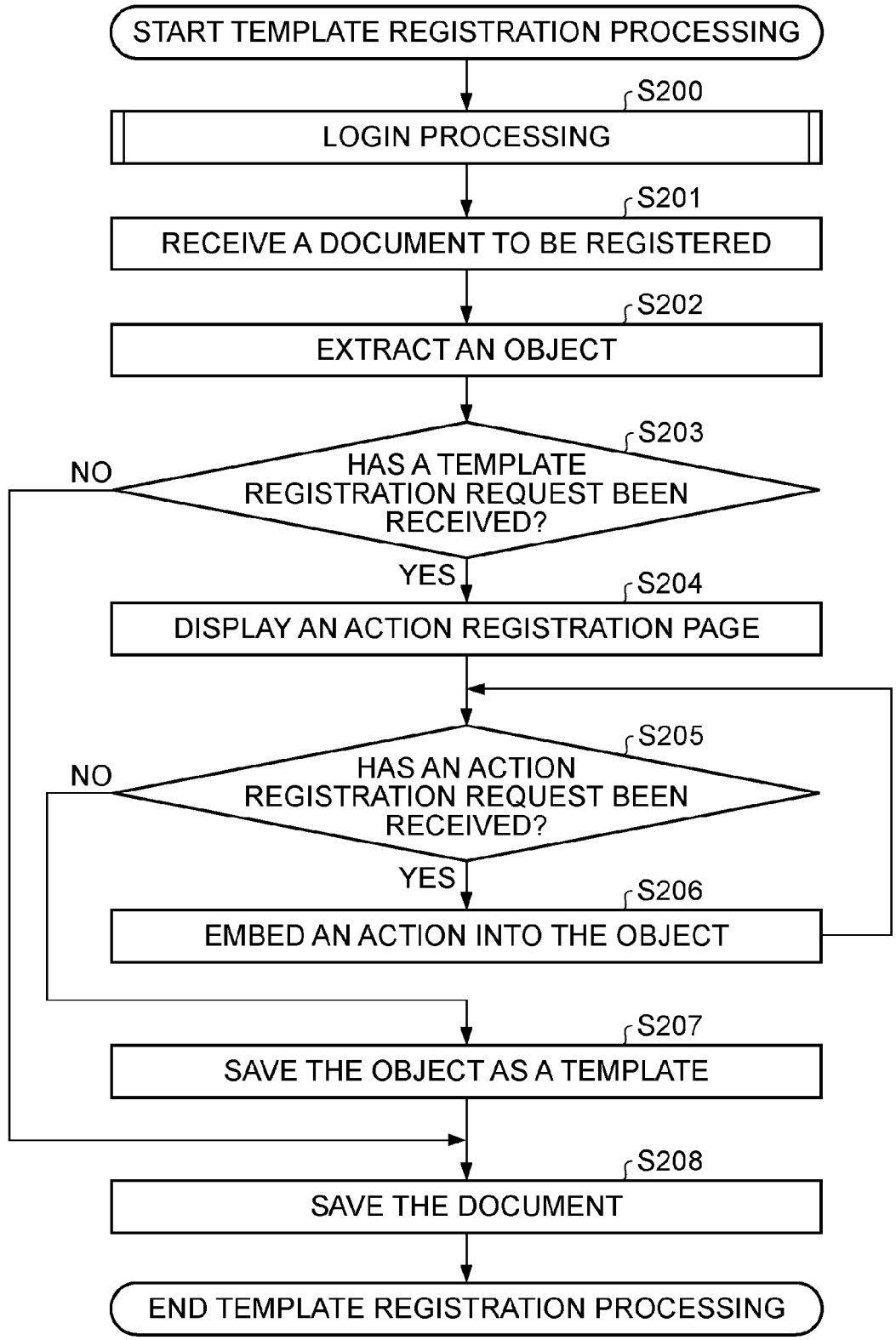
FIG. 8 is a flowchart illustrating an example of a second data processing procedure with the document management system according to the present embodiment.

FIG. 8 is a flowchart illustrating an example of a second data processing procedure with the document management system according to the present embodiment. The present example is a processing example wherein the user logs in the present system to register user characteristics. Note that the steps S200 through S208 are realized by the main control unit 200 of the web application server PC 20 controlling the document management server PC 40. More specifically, these steps are realized by the CPU 100 included in the web application server PC 20 and the CPU 100 included in the document management server PC 40 executing the control program shown in FIG. 3.

In step S200, the user C logs in the present document management system through the browser of the client PC 12. Login processing is such as shown in the detailed flow of the login processing in FIG. 5.

Next, upon the user C executing document registration at the user C's page displayed on the browser in step S200, in step S201 the main control unit 200 receives a document to be registered as a template through the data transmission/reception unit 201. Subsequently, the received document is stored at the session storage unit 202 in a manner correlated with the session information once. Note that, with regard to this document management, for example, document data stored (locally) in the client PC 12 is registered through the browser.

Next, in step S202, the main control unit 200 instructs the document analyzing unit 402 of the document management server PC 40 to subject the document stored in the session storage unit 202 in step S201 to predetermined confirmation processing, and performs object extraction processing. Here, the main control unit 200 extracts an object within the document information, and temporarily stores the extracted document in the session storage unit 202 along with the attribute information of the extracted object in a correlated manner. Here, information indicating whether the object thereof is a text or image, information such as a name which the user can arbitrarily specify, or the like is set in the attribute information. Additionally, a later-described program may be set an object as the attribute information.

Note that, with regard to the object extraction, a known technique may be employed wherein the inside of each page of a document is analyzed, and region division is performed. As a specific region division example, a lump of texts may be divided for each paragraph, a predetermined image, diagram, or table portion may be divided.

Also, the grain size of region division may be determined automatically, or an arrangement may be made wherein the user specifies a range, or the results of automatic region division are given to the user, and the user corrects the results.

Next, in step S203, the main control unit 200 determines whether or not the user C has requested to register the document held in the session storage unit 202 in step S201 as a template for realizing a workflow. Note that this request may be done by the user C instructing to store the document as a template at the time of executing document registration on the user C's page displayed in step S200, or may be another method other than that. In a case where the main control unit 200 determines that the user C has not requested to register the document as a template, the main control unit 200 proceeds to step S208.

On the other hand, in a case where the main control unit 200 determines in step S203 that the user C has requested to register the document as a template, in step S204 the main control unit 200 requests the web UI generating unit 203 to generate an action registration page as to a template.

Subsequently, the main control unit 200 returns the action registration page of the present document management system to the client PC 12 through the data transmission/reception unit 201 as a response, and controls the browser of the client PC 12 to display the action registration page. Note that a mode may be employed as an example of the unshown action registration page wherein a list of objects extracted from a document page in step S202 is displayed, whereby the user can perform selection and registration instruction and so forth of an object therefrom.

Next, in step S205, the main control unit 200 determines whether or not the user C has operated the action registration page displayed on the browser of the client PC 12 in step S203 to specify any action as to an object extracted within a page of the document. Here, in a case where the main control unit 200 determines that the user C has not specified an action as to an extracted object, the main control unit 200 proceeds to step S207.

On the other hand, in a case where the main control unit 200 determines in step S205 that the user C has specified an action as to an object extracted from the document, the main control unit 200 receives the user C's instruction through the data transmission/reception unit 201. Subsequently, in step S206, the main control unit 200 instructs the program control unit 405 to read out a program for executing the user C's instruction from the program storage unit 406, and embed this in later-described object attribute information 1102. Subsequently, in step S207, the main control unit 200 stores the object in which the program is embedded in the session storage unit 202 as a template.

Note that as an example of the program embedded in the attribute information 1102 is an action for realizing a workflow such as "an e-mail notification is sent to the boss", "another document is created/issued", or the like. Note that the present example is an example of actions, which are adapted to the environment of a user for executing a workflow, and accordingly, is not restricted to such an example.

Figure 9:
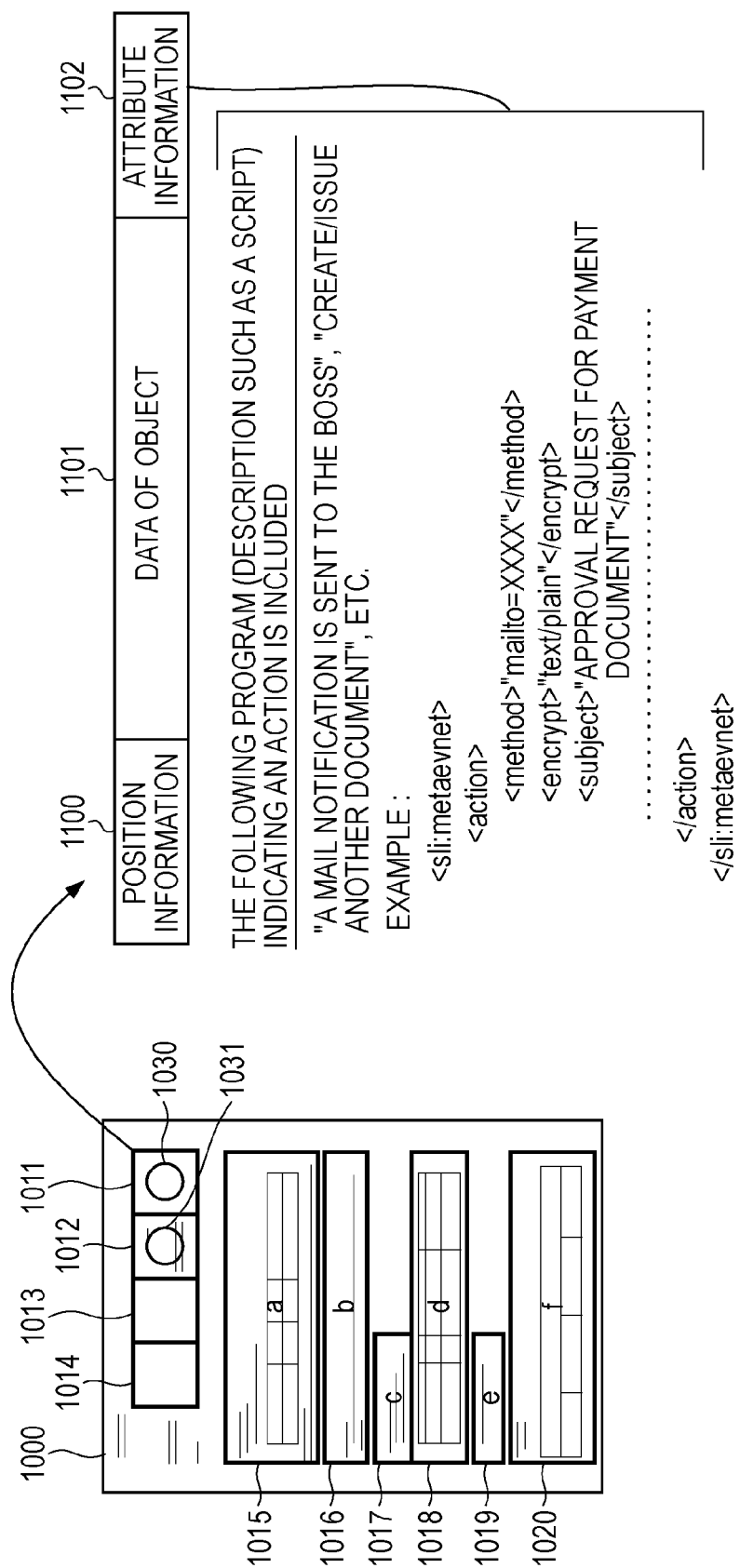
FIG. 9 is a diagram illustrating an example of results wherein an action is specified as to an object extracted from within a document page with the document management system according to the present embodiment.

FIG. 9 is a diagram illustrating an example of results obtained by specifying an action as to an object extracted from a document page with the document management system according to the present embodiment. Note that the object is extracted in the processing executed in step S202. FIG. 9 illustrates document data 1000, wherein there are respective objects 1011 through 1020 extracted in step S202, the objects 1011 through 1014 denote signature blocks, and signatures 1030 and 1031 exist in the signature blocks 1011 and 1012.

The object of the signature block 1011 is configured of position information 1100 indicating a position within the document, the actual data 1101 of the object, and attribute information 1102. A program for executing an action specified by the user C is embedded in the attribute information 1102, but information other than that may be embedded therein.

Note that the object data 1101 may be any kind of information such as an image, diagram, table, text, or the like. Also, the configuration of an object is not restricted to this format as long as the position information 1100, object data 1101, and attribute information 1102 are each individually managed and stored so as to determine relationship between these.

Also, an arrangement may be made wherein in step S205 the user C can specify the order for performing an action. For example, with the document data 1000, information to the effect that the object 1011 is an object for causing an action first is embedded in the attribute information 1102, and information to the effect that the object 1012 is an object for causing an action second is embedded in the attribute information. Thus, processing considering each step of the workflow can be performed sequentially. That is to say, the signatures from the signature blocks 1011 through 1014 are performed sequentially, thereby ending each step of the present document. Also, as shown in FIG. 9, when a signature is given to a certain object for signature (1012), the content of the program embedded in the object thereof is automatically transmitted to the next acknowledger by e-mail, whereby a smooth work flow can be executed.

Further, with the present embodiment, an action is executed by signatures being given to the signature blocks 1011 through 1014, but for example, in a case where correction within a particular object within the document is performed, or the like, determination for executing an action is not restricted to this.

Next, upon the user C ending the specification of an action in step S205, in step S207 the main control unit 200 instructs the document information operating unit 400 to store all of the objects temporarily stored in the session storage unit 202 in the document information storage unit 401 as templates.

Next, in step S208, the main control unit 200 instructs the document information operating unit 400 to store the document stored in the session storage unit 202 in step S201 in the document information storage unit 401, and ends the present processing. Note that, at this time, the document stored in the session storage unit 202 in step S201 is stored in a manner correlated with information such as an ID or the like whereby the template information of the document stored in step S207 can be determined.

Document Creation Processing

With the present embodiment, in order to execute a workflow, a document stored in the document information storage unit 401 of the document management server PC 40 as a document template is employed. Specifically, the user A accesses (logs in to) the present document management system through the browser of the client PC 10 to copy and create a document for executing a workflow, and registers this on the present system.

Figure 10:
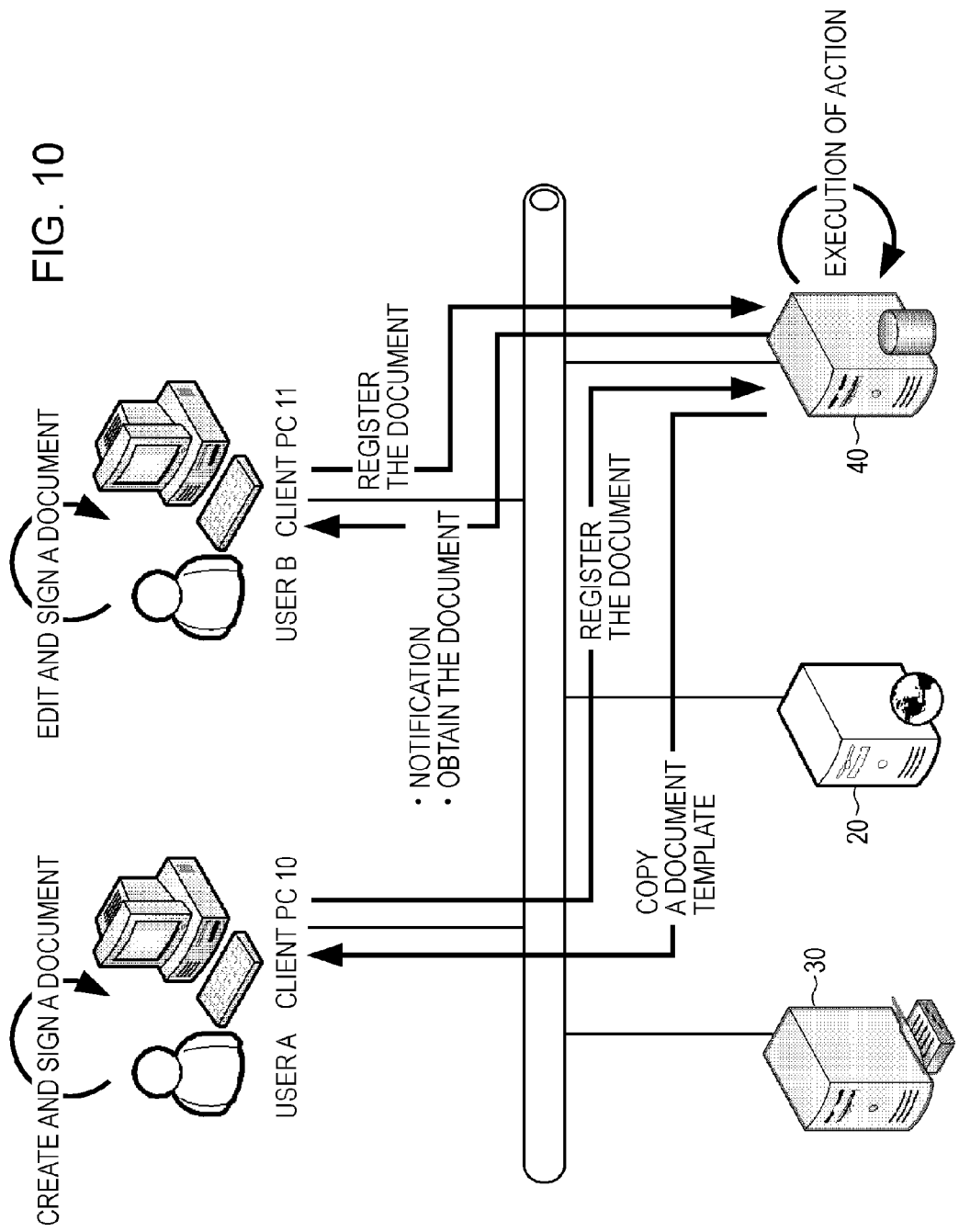
FIG. 10 is a diagram illustrating an example of template registration processing with the document management system according to the present embodiment.

FIG. 10 is a diagram illustrating an example of template registration processing with the document management system according to the present embodiment. The present example illustrates a workflow at the time of document creation processing with the document management system. The present example is an example wherein the user A executes an operation for creating and signing a document, and the user B executes an operation for editing and signing a document.

Figure 11:
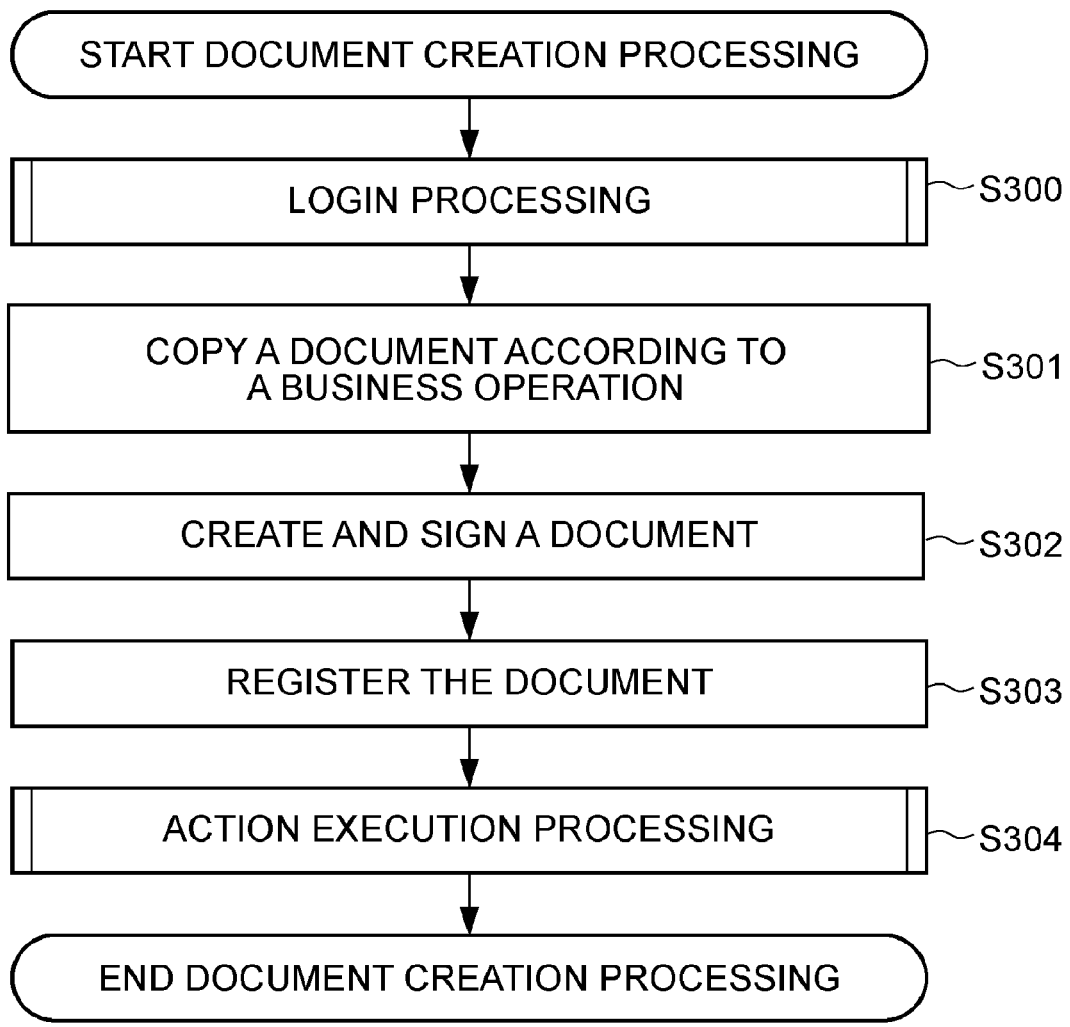
FIG. 11 is a flowchart illustrating an example of a third data processing procedure with the document management system according to the present embodiment.

FIG. 11 is a flowchart illustrating an example of a third data processing procedure with the document management system according to the present embodiment. The present example is a processing example wherein the user A logs in the present document management system through the browser of the client PC 10 to create and sign a document. Here, the login processing is the same as the login processing shown in FIG. 5. Note that reference symbols S300 through S304 denote the respective steps. Also, each step is realized by the main control unit 200 of the web application server PC 20 controlling the document management server PC 40. More specifically, each step is realized by the CPUs 100 included in the web application server PC 20 and document management server PC 40 executing the control program.

In step S300, the user A logs in the present document management system through the browser of the client PC 10. The login processing is the same as the login processing shown in FIG. 5.

Next, in step S301, the main control unit 200 copies a document corresponding to a business operations for executing a workflow on the user A's page displayed in step S300. Here, copying of a document may be copying a document within the document management server PC 40, or may be downloading a document in the client PC 10. With the present embodiment, description will be made regarding the case where a document is downloaded in the client PC 10. Note that, at this time, an ID or the like for determining the document may be added to the copied document. Thus, the document of the previous version can be searched at the time of later-described action execution processing.

The main control unit 200 instructs the document information operating unit 400 to obtain a document which the user desires from the document information storage unit 401. Subsequently, the main control unit 200 transmits the document to the client PC 10 through the data transmission/reception unit 201.

Note that the main control unit 200 may store the information of the document, and the template information correlated with the document in the session storage unit 202 in a manner correlated with the session information. In this case, in a case where the user A registers a document during the same session, processing for extracting the corresponding document from the document information storage unit 401 through the document searching unit 403 and document comparing unit 404 can be omitted.

Next, in step S302, based on the document transmitted to the client PC 10 in step S301, the user A fills in information necessary for the document to create the document, and gives a signature in a signature block within the document. Note that, with regard to a method for giving a signature, the name of the user A may be described or seal data may be added, and accordingly, the method thereof is not restricted. Note that seal data may be managed by the client PC 10 or may be managed by the user information storage unit 301.

Next, in step S303, the document created by the user A in step S302 is registered on the present document management system. Specifically, the main control unit 200 receives the document through the data transmission/reception unit 201, and stores in the session storage unit 202 in a manner correlated with the session information once.

Next, in step S304, based on the document stored in the session storage unit 202 by the main control unit 200, the main control unit 200 executes the action, and ends the present processing. Note that the details of the action execution processing in step S304 will be described later.

Document Editing Processing

Figure 12:
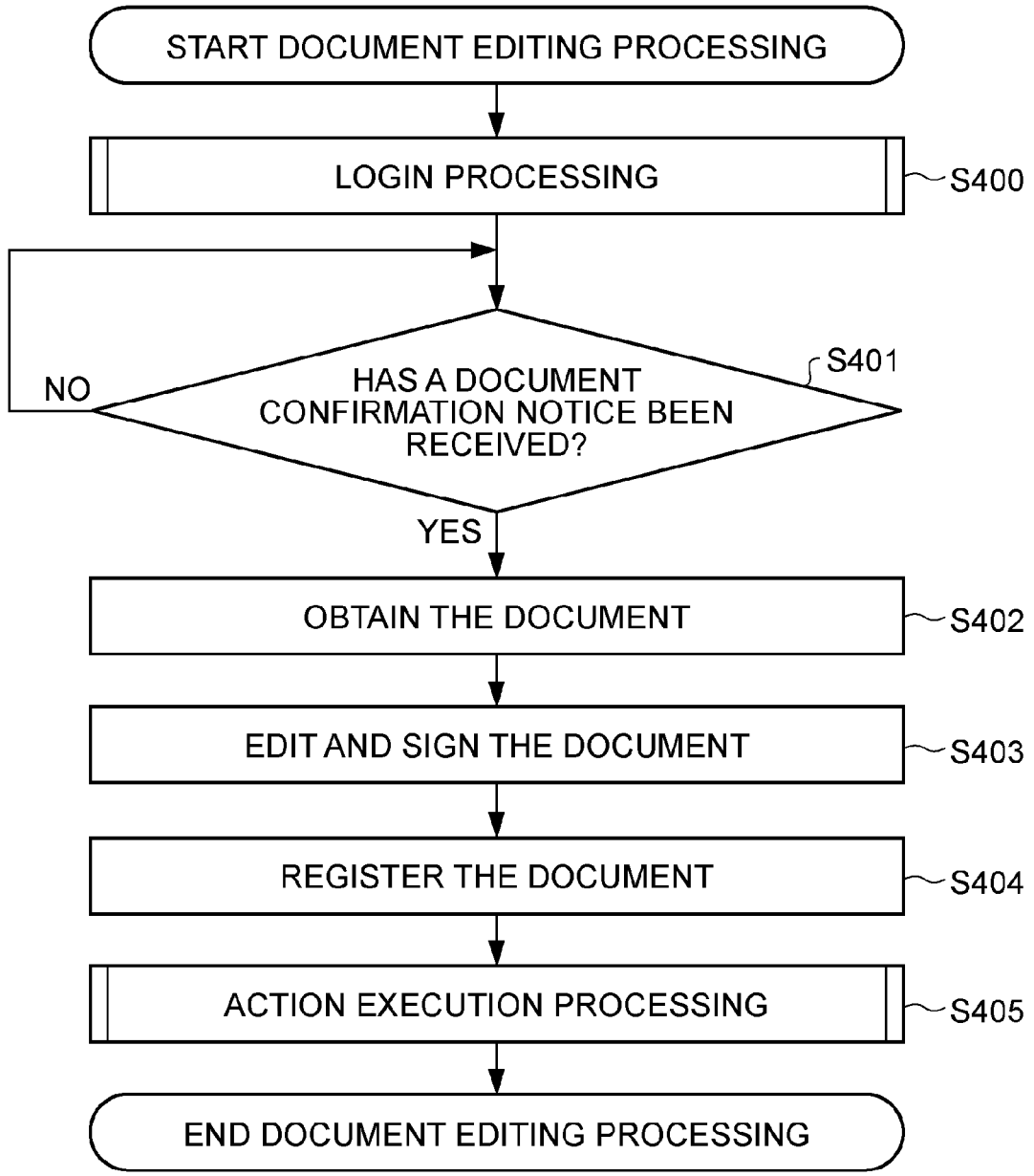
FIG. 12 is a flowchart illustrating an example of a fourth data processing procedure with the document management system according to the present embodiment.

FIG. 12 is a flowchart illustrating an example of a fourth data processing procedure with the document management system according to the present embodiment. The present example is a processing example wherein the user B shown in FIG. 10 logs in the present document management system through the browser of the client PC 11 to edit and sign a document. More specifically, the present example is a processing example wherein the user B obtains and edits a document to execute a workflow, and registers this on the present system. Here, the login processing is the same as the login processing shown in FIG. 5. Note that reference symbols S400 through S405 denote the respective steps. Also, each step is realized by the main control unit 200 of the web application server PC 20 controlling the document management server PC 40. More specifically, each step is realized by the CPUs 100 included in the web application server PC 20 and document management server PC 40 executing the control program shown in FIG. 3.

In step S400, the user B logs in the present document management system through the browser of the client PC 11. The login processing is the same as the login processing shown in FIG. 5.

Next, in step S401, the main control unit 200 determines whether or not a notice for confirming a document for executing a workflow on the user B's page displayed in step S400 has been received. Specifically, a task list or pending approval document list or the like exists on the unshown user B's page within a user interface, where the information of documents which the user B should confirm is described.

Now, a notification method for confirming the document as to the user B may be a method other than the above-mentioned method. For example, an arrangement may be made wherein a document confirmation request is received by e-mail, an ID for determining the document to be confirmed such as a URL or the like is described within the e-mail, and the user B directly accesses the document to be confirmed through the browser of the client PC 11.

Next, in step S402, the main control unit 200 obtains the document for executing a workflow on the user B's page displayed in step S401. Here, obtaining of the document may be copying the document within the document management server PC 40, or may be downloading the document in the client PC 11. With the present embodiment, description will be made regarding the case where the document is downloaded in the client PC 11.

Here, the main control unit 200 instructs the document information operating unit 400 to obtain the document which the user B desires from the document information storage unit 401. Subsequently, the main control unit 200 transmits the document to the client PC 11 through the data transmission/reception unit 201.

Note that the main control unit 200 may store the information of the document, and the template information correlated with the document in the session storage unit 202 in a manner correlated with the session information. In this case, in a case where the user B registers a document during the same session, processing for extracting the corresponding document from the document information storage unit 401 through the document searching unit 403 and document comparing unit 404 can be omitted.

Next, in step S403, based on the document transmitted to the client PC 11 from the main control unit 200 of the web application server PC 20 in step S402, the user B confirms the described content of the document, edits this as appropriate, and gives a signature in a signature block within the document.

Note that, with regard to a method for giving a signature, the name of the user A may be described or seal data may be added, and accordingly, the method thereof is not restricted.

Next, in step S404, the document edited by the user B employing the client PC 11 in step S403 is registered on the present document management system. Specifically, the main control unit 200 receives the document through the data transmission/reception unit 201, and stores in the session storage unit 202 in a manner correlated with the session information once.

Next, in step S405, based on the document stored in the session storage unit 202 by the main control unit 200, the main control unit 200 executes the action, and ends the present processing. Note that the details of the action execution processing in step S405 will be described later.

Action Execution Processing

Figure 13:
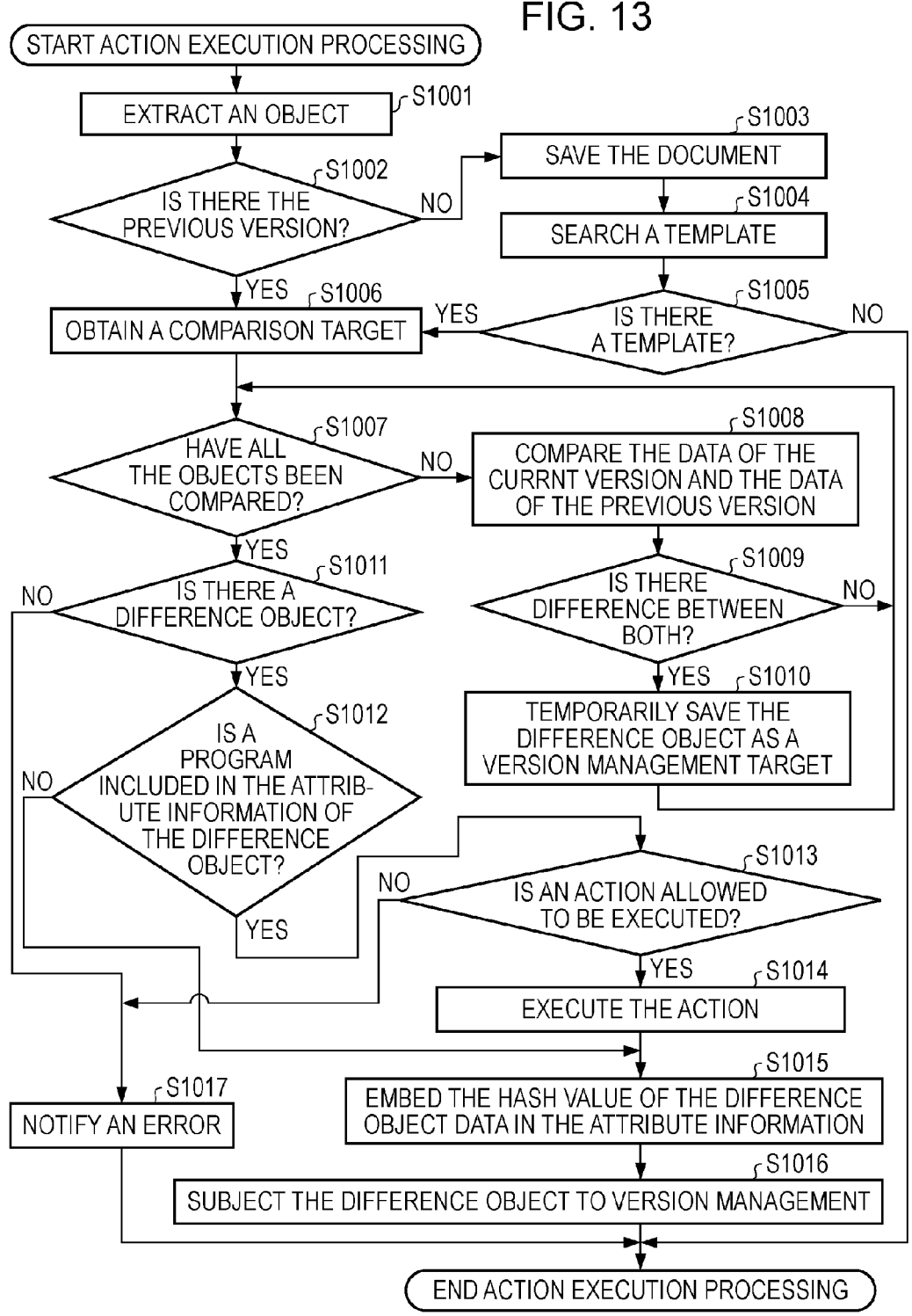
FIG. 13 is a flowchart illustrating an example of a fifth data processing procedure with the document management system according to the present embodiment.

FIG. 13 is a flowchart illustrating an example of a fifth data processing procedure with the document management system according to the present embodiment. The present example is an action execution processing example relating to step S405. The present example is a processing example wherein when the user accesses (logs in to) the present document management system through the browser of the client PC to register the document on the present system to execute a workflow, an action embedded in the attribute information of an object which has changed within the document is executed. Thus, the processing can proceed to the next process of the workflow.

Note that reference symbols S1001 through S1017 denote the respective steps. Also, each step is realized by the main control unit 200 of the web application server PC 20 controlling the document management server PC 40. More specifically, each step is realized by the CPUs 100 included in the web application server PC 20 and document management server PC 40 executing the control program shown in FIG. 3.

Figure 14:
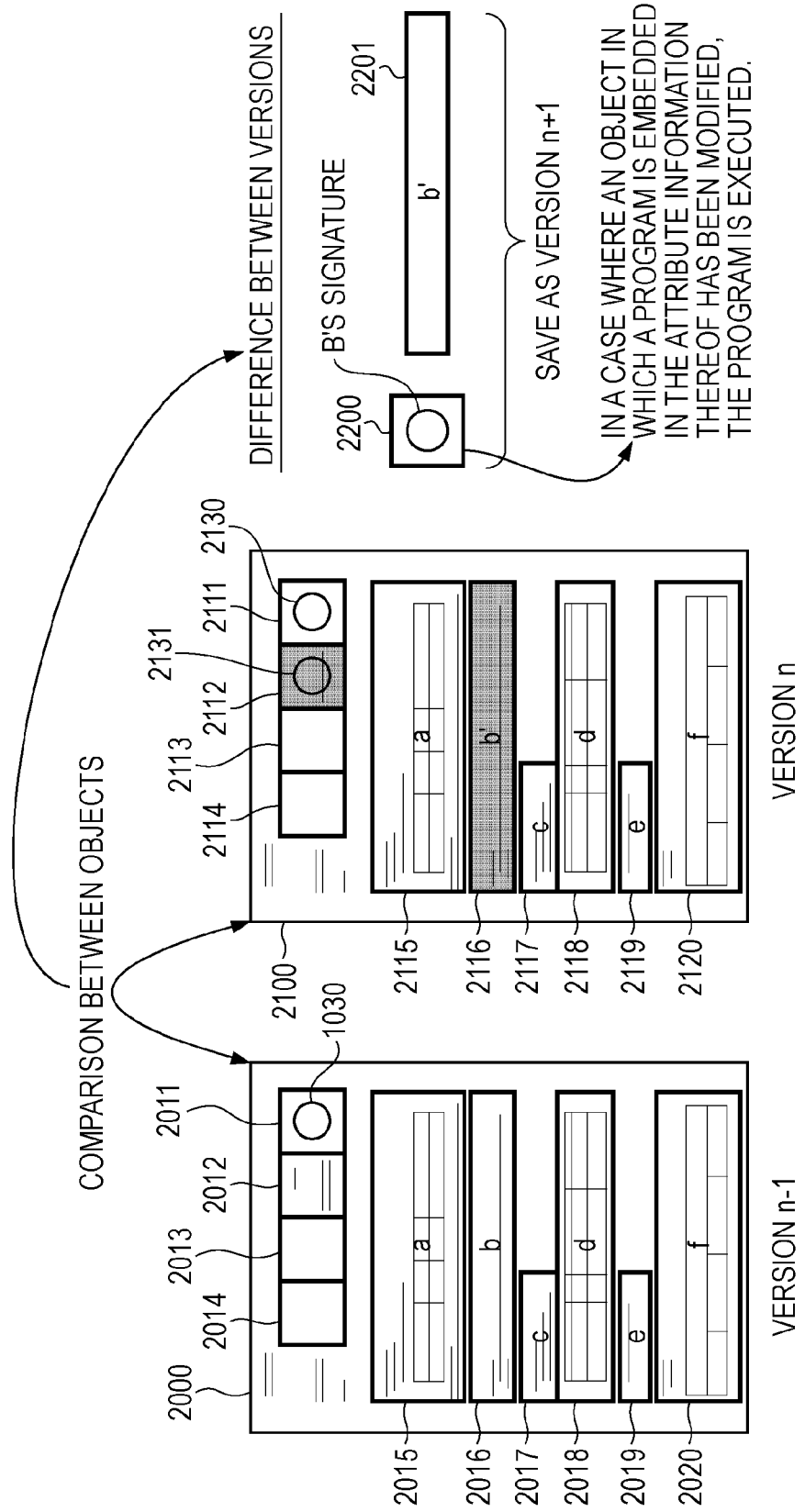
FIG. 14 is a diagram illustrating an example of action execution processing with the document management system according to the present embodiment.

FIG. 14 is a diagram illustrating an example of action execution processing with the document management system according to the present embodiment. Description will be made below regarding an example illustrating comparison between objects.

In step S1001, the main control unit 200 instructs the document analyzing unit 402 to perform analysis as to the document which the user registered, held in the session storage unit 202, thereby performing extraction of an object. The main control unit 200 stores the data of the extracted object in the session storage unit 202 temporarily in a manner correlated with the document thereof. As shown in FIG. 14, a document 2100 (Version n), and extracted objects 2111 through 2120 are temporarily stored in the session storage unit 202.

Next, in step S1002, the main control unit 200 determines whether or not there is the previous version (Version n−1) of the same document serving as a comparison target as to the document stored in the session storage unit 202 in step S1001.

Specifically, in a case where a document is registered during the same session, the document management server PC 40 causes the document comparing unit 404 to determine whether or not the registered document is the previous version by employing the information of the original document stored in the session storage unit 202, and the document saved in step S1001 which the user registered. Note that in a case where there are IDs for determining documents included in both documents with the document comparing unit 404, determination may be made by comparing both IDs, or determination may be made based on the content of a document. Alternatively, when the user registers the document on the present document management system, the user may specify a document serving as an update target.

Now, in a case where the main control unit 200 determines that no document has been registered during the same session, the main control unit 200 instructs the document searching unit 403 to search the document from the document information storage unit 401, and causes the document comparing unit 404 to determine whether the document is the previous version.

Next, in a case where the main control unit 200 determines in step S1003 that there is no previous version of the document which the user registered in step S1002, the main control unit 200 instructs the document information operating unit 400 to store the document in the document information storage unit 401 as the first version. At this time, all of the objects extracted in step S1001 are also stored in the document information storage unit 401.

Next, in step S1004, the main control unit 200 searches the template corresponding to the document stored in the document information storage unit 401 in step S1003. Next, in step S1005, based on the document stored in the session storage unit 202, and the information of the objects extracted in step S1001, the main control unit 200 instructs the document searching unit 403 to determine whether or not there is the template of the document in the document information storage unit 401. Further, the document comparing unit 404 determines whether or not the searched template is the template of the document.

Specifically, in a case where the document includes an ID for determining the template, the document comparing unit 404 may determine by comparing both IDs, or may determine by comparing a combination of objects extracted in step S1001, or the contents of the documents. Also, when registering a document on the present document management system, the user may specify a target template, and accordingly, a method for searching a template is not restricted.

Next, in a case where the main control unit 200 determines in step S1005 that there is no template corresponding to the document stored in the session storage unit 202 in step S1004, the main control unit 200 ends the present processing without executing an action.

On the other hand, in a case where determination is made in step S1005 that there is the previous version as to the document stored in the session storage unit 202, in step S1006 the main control unit 200 obtains a list of objects making up the document of the previous version serving as a document comparison target. More specifically, the main control unit 200 instructs the document information operating unit 400 to obtain a list of objects making up the document of the previous version from the document information storage unit 401, and stores this in the session storage unit 202.

With the present embodiment, as shown in FIG. 14, the document 2000 of all the versions (Version n−1) serving as a document comparison target, and the extracted object data 2011 through 2022 are temporarily stored in the session storage unit 202.

Also, in a case where there is the template corresponding to the document in steps S1004 and S1005, the main control unit 200 obtains a list of objects making up the template serving a document comparison target. More specifically, the main control unit 200 instructs the document information operating unit 400 to obtain a list of objects making up the template from the document information storage unit 401, and stores this in the session storage unit 202. In FIG. 14, the document 2000 (Version n−1) serving as a document comparison target, and a list of objects making up the template (object 2011 through 2022) are temporarily stored in the session storage unit 202.

Next, in step S1007, the main control unit 200 determines whether or not comparison between objects 2111 through 2120 extracted from the document 2100 stored in the session storage unit 202 in step S1001, and all the objects 2011 through 2022 of the document 2000 serving as a comparison target obtained in step S1006 has been completed. Here, in a case where the main control unit 200 determines that comparison has not been completed, in step S1008 the main control unit 200 selects an object of which comparison has not been completed from the objects 2111 through 2120 extracted from the document 2100. Subsequently, the main control unit 200 selects a comparison target from the objects 2011 through 2020 extracted from the document 2000 serving as a comparison target in step S1006, instructs the document comparing unit 404 to compare the data of both objects, and executes object determination processing regarding whether or not there is difference between both objects.

Note that when selecting an object serving as a comparison target from the document 2000 serving as a comparison target, the position information of objects to be compared with the document may be selected, or a method other than that may be employed. Data comparison between objects may be performed by calculating the hash value of actual data of each object, or a method other than that may be employed.

Next, in step S1009, the main control unit 200 confirms from the difference thereof whether or not there is an object which has changed between both objects wherein comparison between the current version and previous version has been made, and in a case where the main control unit 200 determines that there is no difference, the main control unit 200 returns to step S1007, where the main control unit 200 determines whether or not comparison of all the objects 2111 through 2120 extracted from the document 2100 has been completed.

Now, description will be made regarding an example of a method for determining whether or not there is difference between both objects, with reference to FIG. 14.

In a case where the objects 2111 through 2114 of the document 2100 are taken as signature blocks, only the signature data 2130 and 2131 is registered as difference to be permitted on the object 2111 through 2114. Therefore, other than the signature data 2130 and 2131 may be determined as the same.

Also, in a case where objects of which the difference is determined are texts, comparison between text strings is performed, thereby determining whether or not there is difference. Note that a method for determining difference is not restricted to these.

Next, in a case where the main control unit 200 determines that there is difference between both objects in step S1009, in step S1010 the main control unit 200 instructs the document information operating unit 400 to temporarily store an object including difference in the session storage unit 202 as a version management target of "Version n". Thus, an object which has changed can be reported.

More specifically, the main control unit 200 temporarily stores object data including difference of the document 2100 stored in the session storage unit 202, in the session storage unit 202. Here, an objects including difference, with the example shown in FIG. 14, composition between the objects 2112 and 2131 is temporarily stored in the session storage unit 202 as an object 2200, and the object 2116 is temporarily stored in the session storage unit 202 as an object 2201. These are temporarily stored in the session storage unit 202 as difference information. Thus, with the present embodiment, object data is managed wherein all of the objects within the same page including a modified object are not stored sequentially, but only an object of which the difference has been confirmed is sequentially additionally stored. Thus, the operation history information quantity of object data to be stored in the document information storage unit 401 can be suppressed. Further, the main control unit 200 may compress the difference to store compressed difference in the document information storage unit 401.

Next, in a case where comparison of all of the objects has been completed in step S1007, in step S1011 the main control unit 200 determines whether or not a difference object is temporarily stored in the session storage unit 202 as a version management target of "Version n". Here, in a case where the main control unit 200 determines that there is no difference object, in step S1017 the main control unit 200 performs an error notification, and ends the present processing.

On the other hand, in a case where the main control unit 200 determines that a difference object is temporarily stored as a version management target in step S1011, in step S1012 the main control unit 200 determines whether or not a program for executing an action is embedded in the attribute information of a difference object. Here, in a case where the main control unit 200 determines that a program for executing an action is not embedded, the main control unit 200 proceeds to step S1015.

On the other hand, in a case where the main control unit 200 determines in step S1012 that a program is embedded in the attribute information of a difference object, in step S1013 the main control unit 200 determines whether to execute the action in accordance with the program thereof. For example, with the above-described template registration processing, in a case where the user C has specified the order for activating the action of an object of the document 2100, the main control unit 200 determines whether or not actions are executed in accordance with the order. Here, regarding whether or not the action may be executed in accordance with the program may be determined in accordance with another cause.

On the other hand, in a case where the main control unit 200 determines in step S1013 that the action is not executed in accordance with the program, in step S1017 the main control unit 200 performs an error notification, and ends the present processing.

On the other hand, in a case where the main control unit 200 determines in step S1013 that the action is executed in accordance with the program, the main control unit 200 proceeds to step S1014.

Subsequently, in step S1014, the main control unit 200 gives the information of the embedded program to the program control unit 405 to execute the action. The program control unit 405 instructs the user notification unit 407 to inform the user as appropriate in accordance with the content of the program.

Examples of the action to be executed include notification employing e-mail transmission or the like to the boss of the user, and creation/issue of another document. In a case where the content of the embedded program is "e-mail notification to the boss", the superior information of the user who is operating is extracted from the user characteristics table shown in FIG. 6, whereby "e-mail notification to the boss" can be realized. Specifically, as shown in FIG. 9, a program is described as a portion of the attribute information 1102. A variable indicating the boss of the user is specified at the destination specification portion of <method> column, whereby the superior of the processing user is automatically selected as an acknowledger at the time of operation of the program, and e-mail transmission is executed. Here, a document serving as the present processing object may be appended to the content of a transmission e-mail.

Note that an action may be executed by a method other than that. With the present embodiment, user information is managed by sequentially assigning a user level for auditing created or edited document information for each user wherein a workflow is executed.

Further, there is a case where, with regard to an object in which a program which has executed an action once is embedded, the difference object is temporarily stored as a version management target of "Version n" again. Such a case may be determined as sending back (correction request) of a work process from the superior. In this case, as an action at the time of sending back, sending back may be informed to a document creation user by e-mail transmission. Upon the sent-back user advancing the work processes of a workflow by employing the same document, of course, the work processes is sent back, and accordingly, the processes advanced while adding a correction thereto can be managed as history such as described later.

Here, a rule for determining sending back means, for example, a case where the signature data 2130 exists in the signature block 2111 of the document 2100 is deleted (or addition of a strikethrough or the like). Note that sending back processing may be executed with a rule other than that.

Next, in step S1015, the main control unit 200 calculates the hash value of data as to all of the difference objects temporarily stored as a version management target of "Version n" in step S1010, and embeds this in the attribute information of each object.

Thus, the content of data of each object including no tampering will be proved later such as at the time of auditing. Further, the hash value of data has a signature attached thereto, and the signed data is embedded in the attribute information of each object, whereby such data can be employed as reliable information at the time of audit. Note that there is no need to embed the hash value of data as to all of the difference objects, and the hash value of data may be embedded in at least a difference object in which a program is embedded.

Thus, the hash value of data is embedded in a difference object in which a program is embedded, whereby this can be employed as a method which will later prove/determine that the action has already been executed. Note that as a method for determining whether or not the action has already been executed, a method other than the method for embedding a hash value may be employed.

Figure 15:
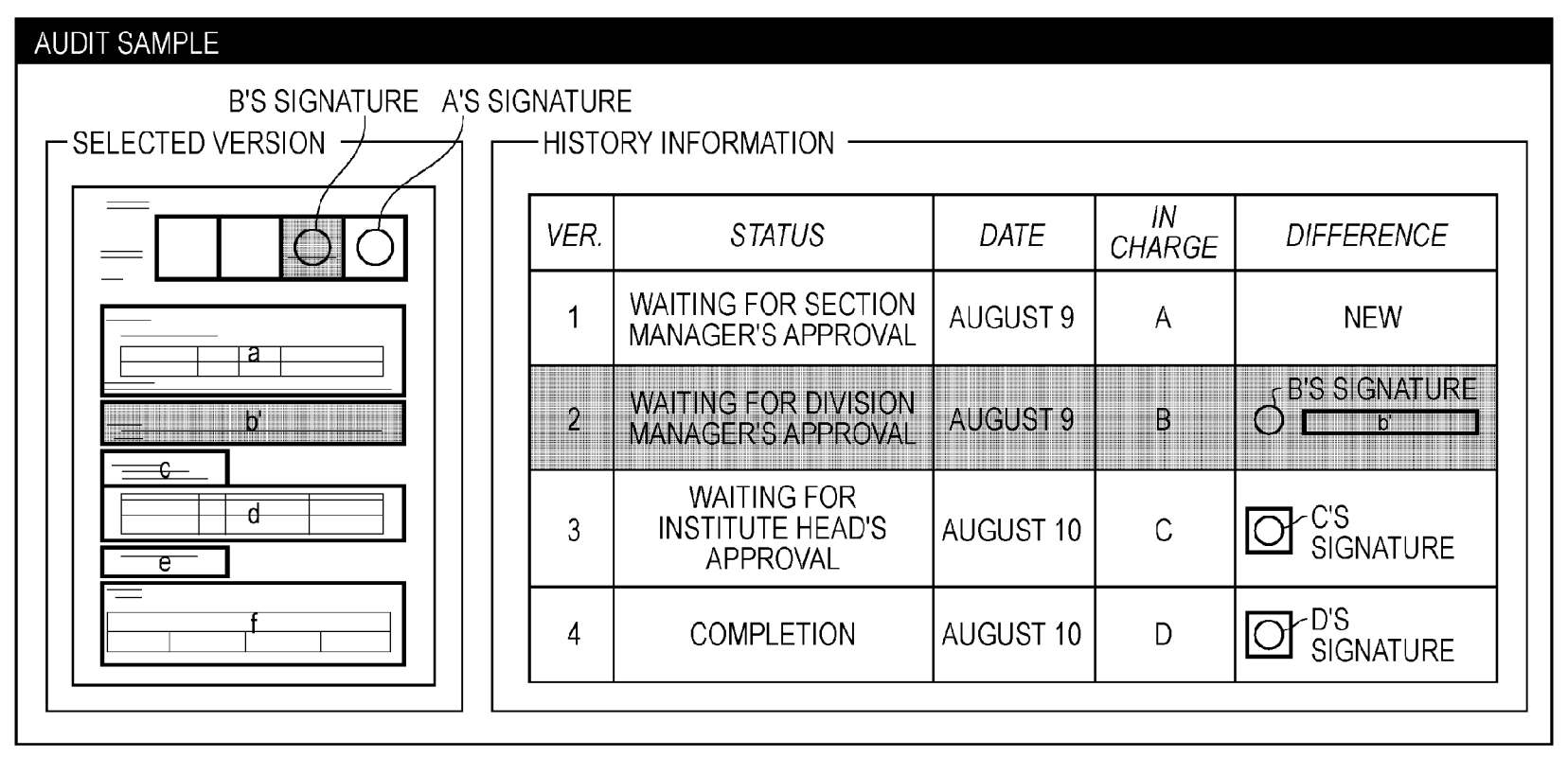

Next, in step S1016, the main control unit 200 instructs the document information operating unit 400 to manage of the version of a difference object in which a hash value has been embed in step S1015 as "Version n", stores this in the document information storage unit 401, and ends the present processing. Thus, with the present embodiment, the difference of an object including difference is managed by version. Thus, as shown in FIG. 15, in the case of executing a workflow as to one document, an operation history each time the information embedded in the attribute information is analyzed and executed may be provided according to the user's request. Moreover, only object data including difference along with execution of the workflow is held, whereby a history information region occupied in the capacity of the document information storage unit 401 can be suppressed.

More specifically, the main control unit 200 stores object data including difference of the document 2100 stored in the session storage unit 202 (here, the composition of the objects 2112 and 2131 is stored as an object 2200, and the object 2117 is stored as an object 2201), in the document information storage unit 401.

FIG. 15 is a diagram illustrating an example of a user interface with the document management system according to the present embodiment. The present example is an example of a user interface for confirming what kind of correction/modification is performed at each process (version) until document creation is completed at the time of audit as a result of a workflow being realized. The user can confirm the information of an object corrected/modified at each process (version) by the user interface shown in FIG. 15 by list, and can also confirm the content of the document at each process (version). Here, the above-mentioned user interface is provided to one of the client PC operated from the main control unit 200, and the provided user interface is displayed through the browser of the client PC. More specifically, in FIG. 15, the preview of a document is performed in a case where the history of version 2 has been selected by the user, and the original document being replaced with the difference object of the process (version) thereof is previewed.

Note that, with the present embodiment, description has been made regarding the case where a program for executing an action is embedded in the attribute information of the objects of the signature blocks 2111 through 2114 of the document 2100.

However, an action may be executed by a method other than that. For example, an arrangement may be made wherein signature data 2130 and 2131 is registered as objects beforehand, and a program for executing an action is embedded in the attribute information of the objects of the signature data, thereby executing the actions.

With the above-mentioned first embodiment, description has been made regarding the case where when registering a document on the document management system, a client PC is employed, but in a second embodiment the present invention may also be applied to a workflow wherein a document is scanned by a multifunction printer to register this on the document management system. Description will be made below regarding the embodiment thereof.

System Configuration

Figure 16:
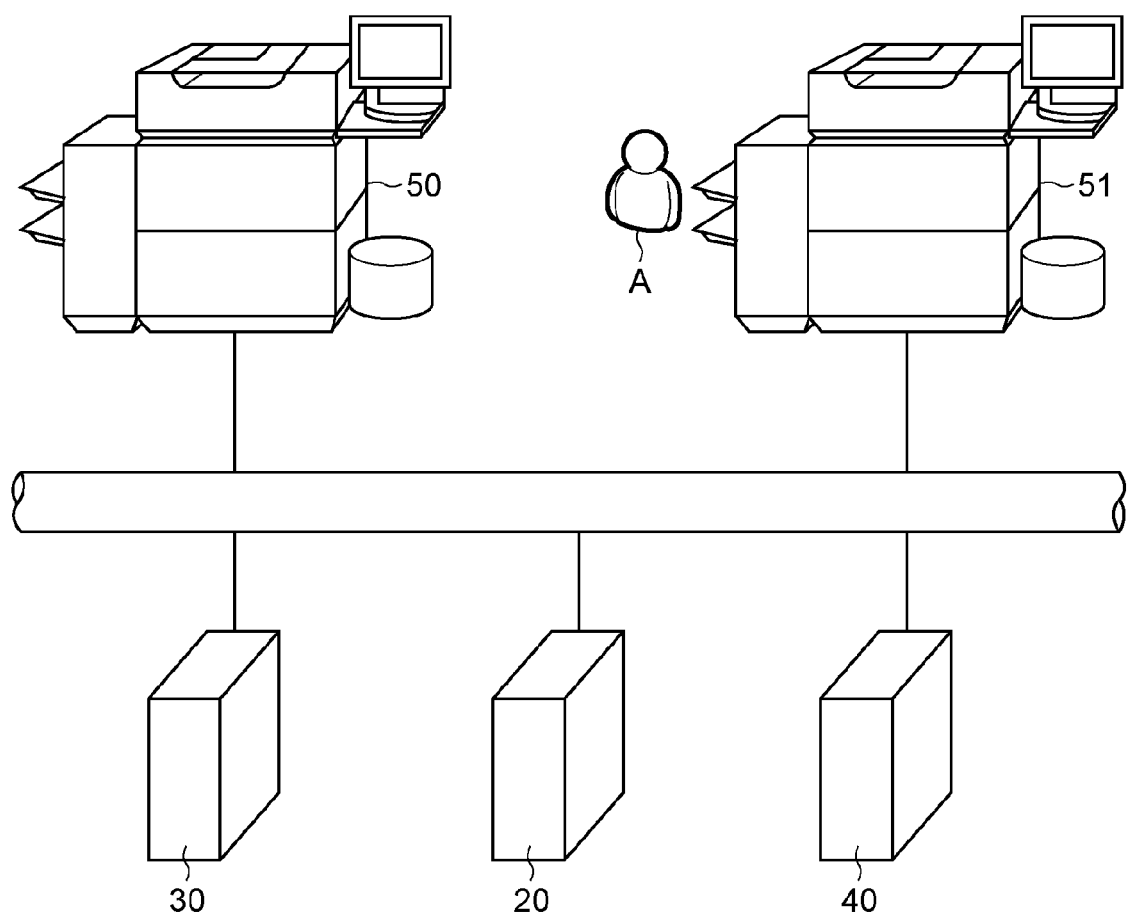
FIG. 16 is a diagram describing the configuration of the document management system according to the present embodiment.

FIG. 16 is a diagram describing the configuration of the document management system according to the present embodiment. The present example is an example wherein the user A and other users can connect to the document management system through the browsers displayed on image processing devices (multifunction printers 50 and 51).

Here, with the configuration of the document management system, the web application server PC 20, user management server PC 30, and document management server PC 40 according to the first embodiment are connected through a network. Note that the web application server PC 20, user management server PC 30, and document management server PC 40 are disposed separately, but may be configured of one PC.

Also, an arrangement is made wherein the user A and other users access the document management system according to the present embodiment through a browser, but an arrangement may be made wherein a dedicated client application is installed in the multifunction printers 50 and 51, and is operated. In this case, an arrangement may be made wherein the document management server PC 40 and the dedicated client application communicate without employing the web application server PC 20.

Note that the multifunction printer 16 includes, as described later, at least a scanner unit for scanning a printed original to read out this, a printer unit for printing image data read out from the scanner unit, or print data received from an external device, and a communication unit for communicating with an external device through a network. The multifunction printer 16 includes a web browser function, and is configured so as to display the user interface provided by the web application server PC 20 on a display unit (not shown).

Document Creation Processing

With the second embodiment, in order to execute a workflow, there is a need to employ the document stored in the document management server PC 40 as a document template. Accordingly, the user A accesses (logs in to) the present document management system through the browser of the multifunction printer 50 to print and create a document to execute a workflow, and registers this on the present system.

Figure 17:
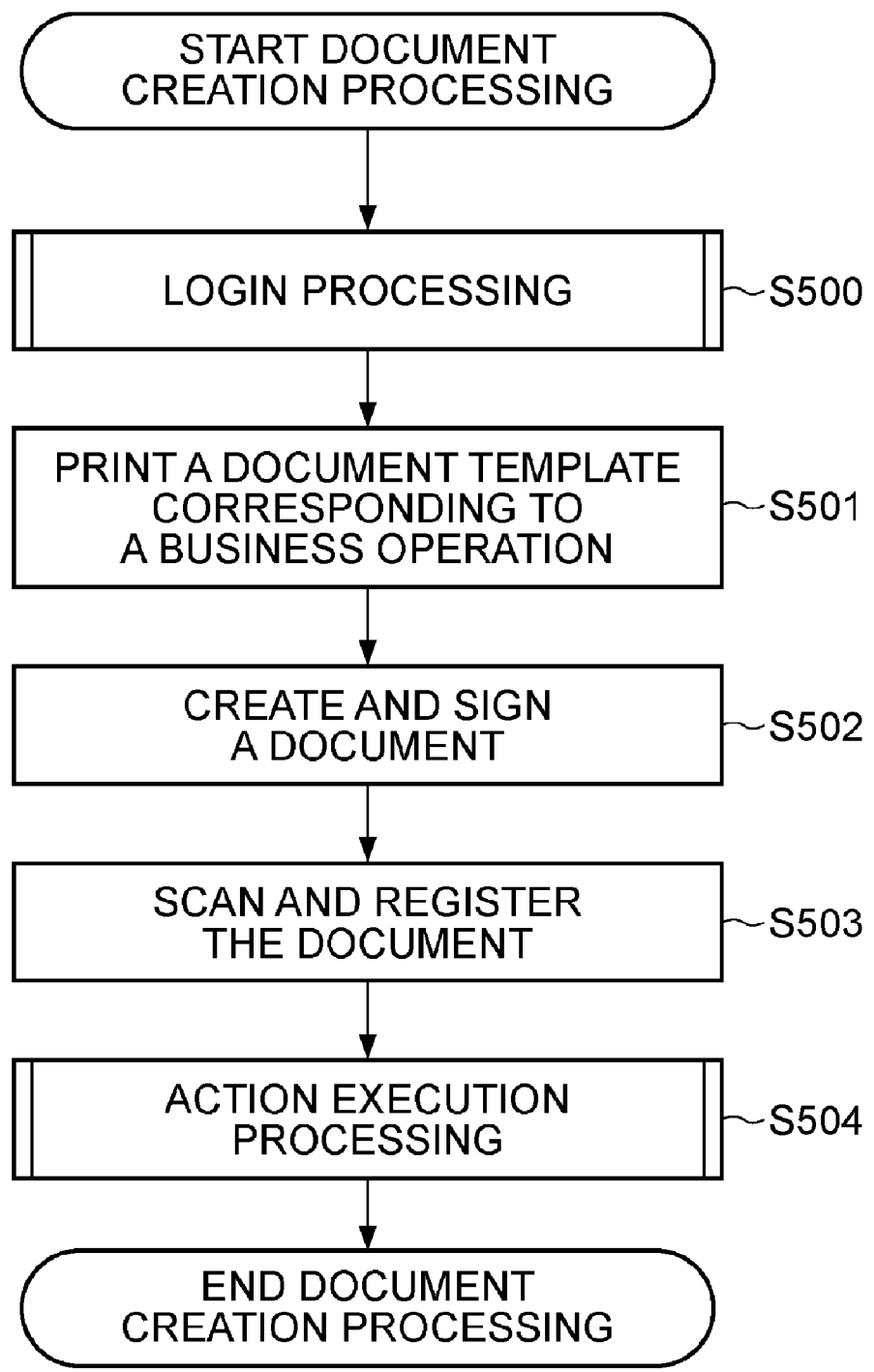
FIG. 17 is a flowchart illustrating an example of a sixth data processing procedure with the document management system according to the present embodiment.

FIG. 17 is a flowchart illustrating an example of a sixth data processing procedure with the document management system according to the present embodiment. The present example is a processing example wherein the user A accesses (logs in to) the present document management system through the browser of the multifunction printer 50, prints and creates a document template to execute a workflow, and registers this on the present system.

Reference symbols S500 through S504 denote respective steps. Also, each step is realized by the main control unit 200 of the web application server PC 20 controlling the document management server PC 40. More specifically, each step is realized by the CPUs 100 included in the web application server PC 20 and document management server PC 40 executing the control program.

In step S500, the user A logs in the present document management system through the browser of the multifunction printer 50. Note that the login processing is the same as the processing shown in FIG. 5.

Next, in step S501, the main control unit 200 prints the document template corresponding to a business operation for executing a workflow on the user A's page displayed in step S500 from the multifunction printer 50. Note that at this time a document ID for determining the document, or the like, may be added within the printed document. Thus, the document of the previous version can be searched at the time of later-described action execution processing.

The main control unit 200 instructs the document information operating unit 400 to obtain the document template which the user A desires from the document information storage unit 401. Subsequently, the main control unit 200 transmits and prints the document template to the multifunction printer 50 through the data transmission/reception unit 201. Note that the main control unit 200 may store the information of the document template in the session storage unit 202 in a manner correlated with the session information. In this case, in a case where the user A registers the document during the same session, the processing for extracting the corresponding document from the document information storage unit 401 through the document searching unit 403 and document comparing unit 404 can be omitted.

Next, in step S502, based on paper document printed from the multifunction printer 50 in step S501, the user A describes and creates information necessary for the paper document, and signs a signature block within the paper document. Note that, with regard to a method for giving a signature, for example, the name of the user A may be described, and the user A's personal seal may be pressed.

Next, in step S503, the paper document which the user A created in step S502 is scanned by the scanner unit of the multifunction printer 50, and is registered on the present document management system. Here, the main control unit 200 receives the image data of the paper document from the multifunction printers 50 and 51 through the data transmission/reception unit 201, and stores in the session storage unit 202 in a manner correlated with the session information once.

Next, based on the image data of the document stored in the session storage unit 202 by the main control unit 200 in step S503, in step S504 the main control unit 200 executes the action, and ends the present processing. Note that the action execution processing is the same as the action execution processing of the document management system according to the first embodiment (FIG. 13).

Document Editing Processing

Figure 18:
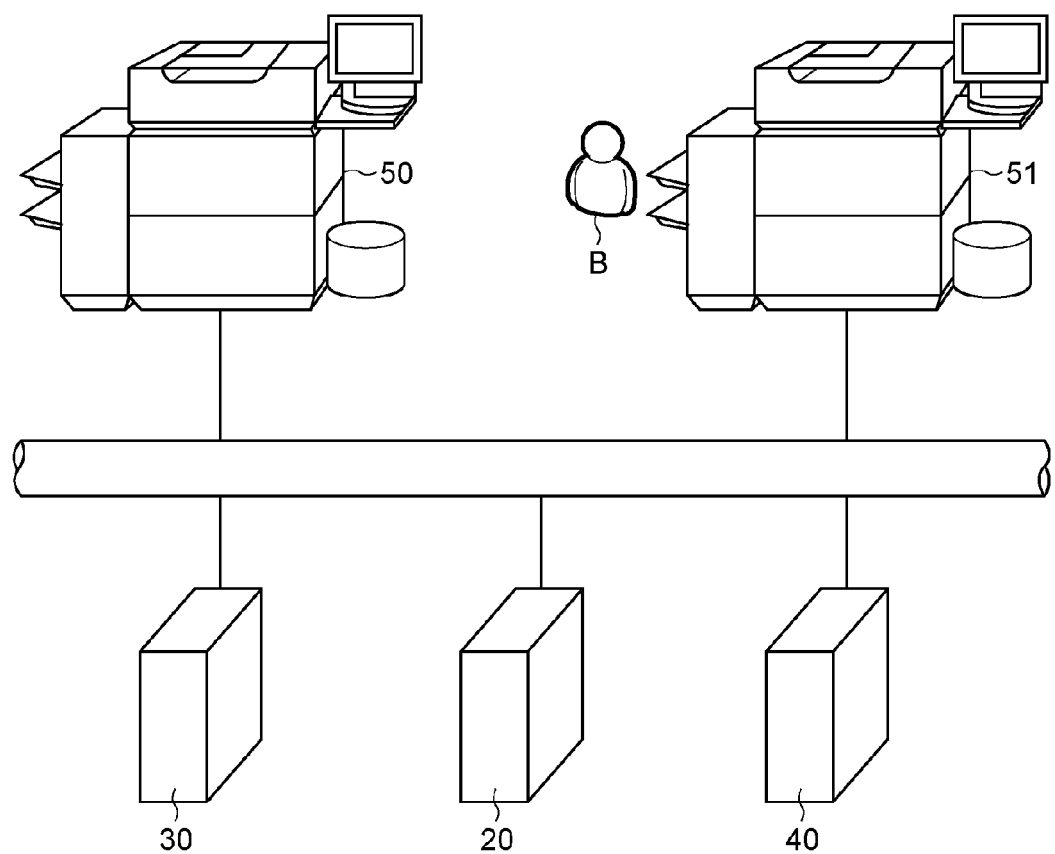
FIG. 18 is a diagram describing document editing processing with the document management system according to the present embodiment.

Document editing processing according to the second embodiment will be described below by employing the document management system shown in FIG. 18. FIG. 18 is a diagram describing the document editing processing with the document management system according to the present embodiment. The present example is an example wherein the user B accesses (logs in to) the present document management system through the browser of the multifunction printer 51, prints and edits the document to execute a workflow, and registers this on the present system.

Figure 19:
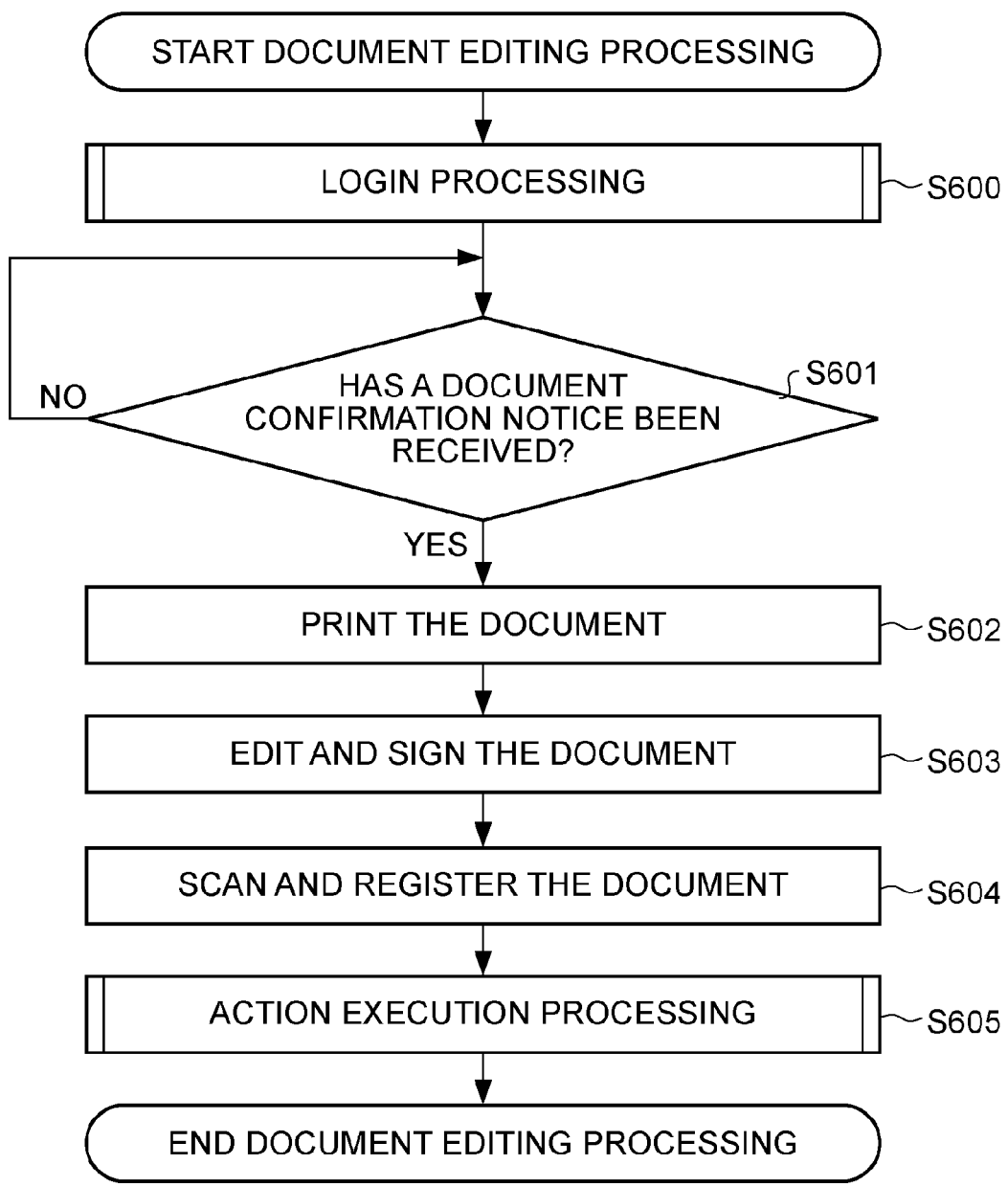
FIG. 19 is a flowchart illustrating an example of a seventh data processing procedure with the document management system according to the present embodiment.

FIG. 19 is a flowchart illustrating an example of a seventh data processing procedure with the document management system according to the present embodiment. The present example is a processing example wherein the user B accesses (logs in to) the present document management system through the browser of the multifunction printer 51 to print the document to execute a workflow, and further, performs document editing, and registers this on the present system.

Note that reference symbols S600 through S605 denote the respective steps. Also, each step is realized by the main control unit 200 of the web application server PC 20 controlling the document management server PC 40. More specifically, each step is realized by the CPUs 100 included in the web application server PC 20 and document management server PC 40 executing the control program.

In step S600, the user B logs in the present document management system through the browser of the multifunction printer 51. The login processing is the same as the login processing shown in FIG. 5.

Next, determination is made in step S601 whether or not a notice for confirming the document to execute a workflow on the user B's page displayed in step S600 has been received. Specifically, a task list or pending approval document list or the like exists on the unshown user B's page within a user interface, where the information of documents which the user B should confirm is described.

Now, a notification method for confirming the document as to the user B may be a method other than the above-mentioned method. For example, an arrangement may be made wherein a document confirmation request is received by e-mail, an ID for determining the document to be confirmed such as a URL or the like is described within the e-mail, and the user B directly accesses the document to be confirmed through the browser of the multifunction printer 51.

Next, in step S602, the document for executing a workflow on the user B's page displayed in step S601 is printed by the printer unit of the multifunction printer 51. Specifically, the main control unit 200 instructs the document information operating unit 400 to obtain the document which the user B desires from the document information storage unit 401. Subsequently, the obtained document is printed from the printer unit of the multifunction printer 51 through the data transmission/reception unit 201.

Note that the main control unit 200 may store the information of the document, and the template information correlated with the document in the session storage unit 202 in a manner correlated with the session information. In this case, in a case where the user B registers a document during the same session, processing for extracting the corresponding document from the document information storage unit 401 through the document searching unit 403 and document comparing unit 404 can be omitted.

Next, in step S603, based on the document printed from the multifunction printer 51 in step S602, the user B confirms the described content of the document, edits the document as appropriate, and gives a signature in a signature block within the document. Note that, with regard to a method for giving a signature, the name of the user B may be described, or the personal seal of the user B may be pressed.

Next, in step S604, the document edited by the user B in step S603 is scanned by the scanner unit of the multifunction printer 50, and is registered on the present document management system. Specifically, the main control unit 200 receives the document through the data transmission/reception unit 201, and stores in the session storage unit 202 in a manner correlated with the session information once.

Next, in step S605, based on the document stored in the session storage unit 202 by the main control unit 200 in step S604, the main control unit 200 executes the action, and ends the present processing. Note that the processing in step S605 is the same as the action execution processing of the document management system according to the first embodiment (FIG. 13).

Note that, with step S1008 of the action execution processing flow of the document management system according to the first embodiment, data comparison between both objects serving as comparison targets may be performed by calculating the hash value of actual data of each object. However, with the second embodiment, another method is desirable. Specifically, in order to subject the image data obtained by scanning a paper document to object division, it is desirable to employ comparison with the feature quantity of an image, or similarity with pattern matching, or the like. A method other than these may be employed.

According to the above-mentioned second embodiment, the user can employ a workflow function even with a paper document. Also, with the document management systems according to the first and second embodiments, description has been made regarding the case where each user employs a client PC alone, or only one of the multifunction printers. However, with the document management systems according to the first and second embodiments of the present invention, each user may employ a client PC, and both of the multifunction printers at each process.

Figure 20:
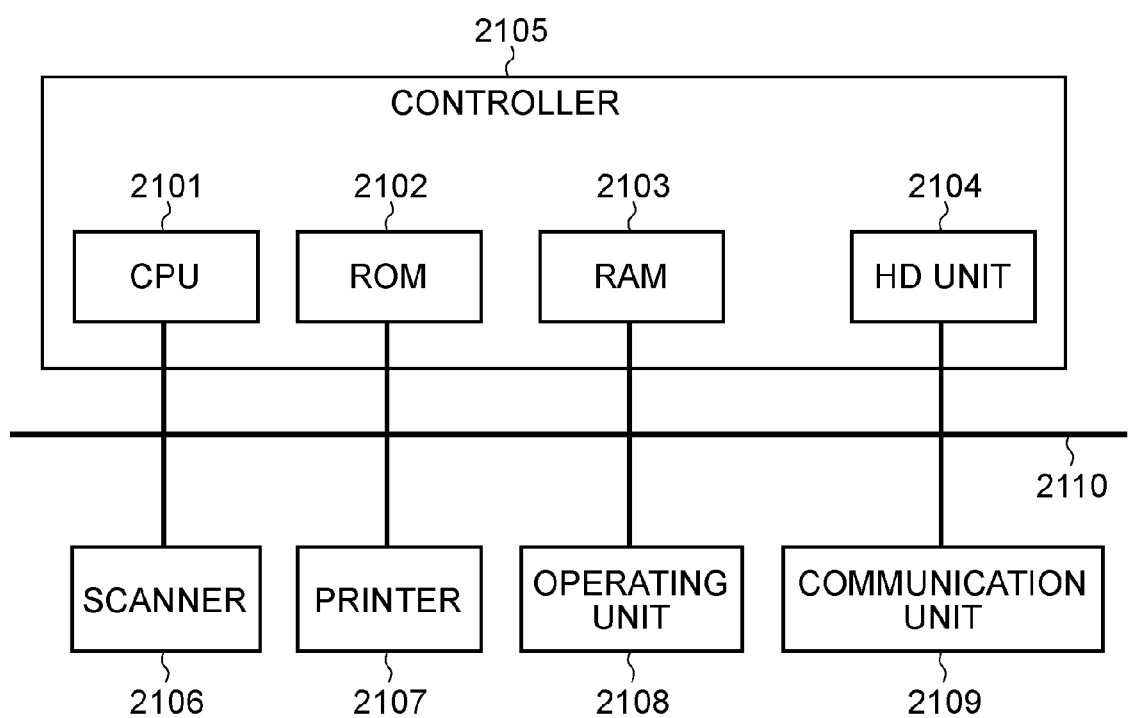
FIG. 20 is a diagram illustrating an example of a multi-function printer for communicating with the document management system according to the present embodiment.

FIG. 20 is a diagram illustrating an example of an image processing device (multifunction printer) for communicating with the document management system according to the present embodiment. In FIG. 20, reference numeral 2105 denotes a controller for controlling the entire device.

With the controller 2105, reference numeral 2101 denotes CPU, which performs the control of this controller and calculation processing and so forth. Reference numeral 2102 denotes ROM, which is a storage region such as the information of a system activation program. Reference numeral 2103 denotes RAM, which is a data storage region of which the usage is not restricted, and reference numeral 2104 denotes a nonvolatile storage device such as a hard disk, SRAM, or the like.

Note that the RAM 2103 is a region where a program for an operating system or communication control or engine control or the like is loaded and executed. Reference numeral 2106 denotes a scanner, which performs an image scanning operation.

Reference numeral 2107 denotes a printer, which performs a print operation under the control of the controller 2105. Reference numeral 2108 denotes an operating unit, which accepts instructions from the user. Here, the operating unit may perform predetermined display. Reference numeral 2109 denotes a communication unit, which performs network communication control, and can communicate with another device, web application server PC 20, and client PCs 10 through 12. Reference numeral 2110 denotes a system bus, which becomes a data path between the above-mentioned components.

Description will be made below regarding the configuration of a data processing program which can be read with the document management system according to a third embodiment of the present invention, with reference to the memory map shown in FIG. 21. FIG. 21 is a diagram describing the memory map of a storage medium which stores various types of data processing program which can be read out with the document management system according to the present invention.

Note that, though not shown in the drawing, information for managing a program group to be stored in a storage medium, e.g., version information, creator, and so forth are stored, and also information depending on the OS on the program readout side, or the like, e.g., an icon for identifying and displaying a program, or the like is also stored in some cases.

Further, data belonging to each type of program is also managed in the above-mentioned director. Also, a program for installing various types of program in a computer, or in a case where a program to be installed is compressed, a program for decompressing the compressed program, or the like is also stored in some cases.

The functions shown in FIGS. 5, 8, 11 through 13, 17, and 29 with the present embodiment may be executed with a host computer by a program to be installed externally. In this case, the present invention is applied to a case where an information group including a program is supplied from a storage medium such as CD-ROM, flash memory, FD, or the like, or from an external storage medium through a network, to an output device.

As described above, a storage medium in which software program code for realizing the functions of the above-mentioned embodiments is recorded is supplied to a system or device. Subsequently, it goes without saying that a computer (or MPU or MPU) of the system or device thereof reads out and executes the program stored in the storage medium, thereby realizing the functions of the above-mentioned embodiments. In this case, the program code itself read out from the storage medium realizes a new function of the present invention, and the storage medium storing the program code thereof makes up the present invention.

Accordingly, the mode of the program is not restricted to any particular mode such as an object code, program to be executed by interpreter, script data to be supplied to the OS, or the like as long as it has a program function.

Examples of storage media which can be employed for supplying the program include flexible disks, hard disks, optical discs (CD-ROM, CD-R, CD-RW, DVD, etc.), magneto-optical disks (MO), magnetic tape, nonvolatile memory card, ROM, and so forth. In this case, the program code itself read out from a storage medium realizes the functions of the above-mentioned embodiments, and accordingly, the storage medium in which the program code thereof is stored makes up the present invention.

Additionally, as a method for supplying the program, the browser of a client computer may be employed to connect to a homepage of the Internet. Subsequently, the computer program itself of the present invention, or a compressed file including an automatic installation function is download from the homepage to a recording medium such as a hard disk or the like, thereby supplying the program. Alternatively, the program code making up the program of the present invention is divided into multiple files, and each of the files is downloaded from a different homepage, thereby supplying the program. That is to say, a WWW server, ftp server, and so forth for allowing multiple users to download the program file for realizing the function processing of the present invention at a computer are also encompassed in Claims of the present invention.

Alternatively, the program of the present invention may be encrypted and stored in a storage medium such as CD-ROM or the like, and is distributed to users. A user who satisfies a predetermined condition is allowed to download key information which decrypts encryption from a homepage through the Internet. Subsequently, the user executes the encrypted program by employing the key information thereof to install the program of the present invention to a computer, thereby supplying the program.

Also, the functions realized by the computer executing the read program code are not restricted to the functions of the above-mentioned embodiments. For example, based on an instruction of the program code thereof, the OS (Operating System) or the like running on the computer executes a portion or all of the actual processes. It goes without saying that a case where the functions of the above-mentioned embodiments are executed by the processing thereof is also encompassed in the present invention.

Further, the program code read out from the storage medium is written in memory included in a function expansion board inserted in the computer or a function expansion unit connected to the computer. Subsequently, based on an instruction of the program code thereof, the CPU or the like included in the function expansion board or function expansion unit executes a portion or all of the actual processes. It goes without saying that a case where the functions of the above-mentioned embodiments are executed by the processing thereof is also encompassed in the present invention.

The present invention is not restricted to the above-mentioned embodiments, and various modifications (including an organic combination of the respective embodiments) may be made based of the essence of the present invention, which are not excluded from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-130649 filed May 19, 2008, which is hereby incorporated by reference herein in its entirety.

What is claimed is:

1. A management device for managing document information comprising:
   an extracting unit configured to extract an object from the document information;
   a comparison unit configured to compare first and second objects extracted from the document information, a first object having been extracted by the extracting unit from document information of a current version of a document, and a second object corresponding to the first object having been extracted from document information of a previous version of the document, and to determine whether there is a change between the first and second objects; and
   a processing unit configured to perform a process, based on instructions included in the changed object determined by the comparison unit.

2. The management device according to claim 1, further comprising:
   a storing unit configured to store the object compared by the comparison unit in a manner correlated with the current version information.

3. The management device according to claim 1, further comprising:
   an obtaining unit configured to obtain user information;
   wherein the processing executed by the processing unit is transmission of an e-mail to the address correlated with the user information of a user who has input the information of the current version obtained by the obtaining unit.

4. The management device according to claim 1, further comprising:
   an outputting unit configured to notify the version of the document information, and an object stored in the storing unit in a manner correlated with each version, which object has changed.

5. The management device according to claim 1, further comprising:
   a determining unit configured to, in a case where information instructing execution of particular processing included in a plurality of objects extracted from the document information of the current version includes the specification of an order for performing the particular processing, determine whether to execute the particular processing according to the order;
   wherein in a case where determination is made that the particular processing should not be executed by the determining unit, the particular processing is not executed by the processing unit, and in a case where determination is made that the particular processing should be executed by the determining unit, the particular processing is executed by the processing unit.

6. A management method for a management device for managing document information, comprising the steps of:
   extracting of an object from the document information;
   comparing of first and second objects extracted from the document information, a first object having been extracted in the extracting from document information of a current version of a document, and a second object corresponding to the first object having been extracted from document information of a previous version of the document, and determining whether there is a change between the first and second objects; and
   performing a process based on instructions included in the changed object determined in the comparison.

7. The management method according to claim 6, further comprising the step of:
   storing the object, distinguished in the comparison, in a storing unit in a manner correlated with the current version information.

8. The management method according to claim 6, further comprising the step of:
   obtaining user information;
   wherein the processing executed in the obtaining is transmission of an e-mail to the address correlated with the user information of a user who has input the information of the current version obtained in the obtaining.

9. The management method according to claim 6, further comprising the step of:
   outputting the version of the document information, and an object stored in the storing unit in a manner correlated with each version, which object has changed, to notify the version of the document information and the object.

10. The management method according to claim 6, further comprising the step of:
    determining, in a case where information instructing execution of particular processing included in a plurality of objects extracted from the document information of the current version and which information instructing execution includes the specification of an order for performing the particular processing, whether to execute the particular processing according to the order;
    wherein in a case where determination is made that the particular processing should not be executed in the determining, the particular processing is not executed in the processing, and in a case where determination is made that the particular processing should be executed in the determining, the particular processing is executed by the processing.

11. A computer-readable storage medium in which a program for realizing the management method according to claim 6 is stored.

* * * * *